US011386490B1

(12) United States Patent
Plante et al.

(10) Patent No.: US 11,386,490 B1
(45) Date of Patent: *Jul. 12, 2022

(54) GENERATING GRAPHICAL USER INTERFACES COMPRISING DYNAMIC CREDIT VALUE USER INTERFACE ELEMENTS DETERMINED FROM A CREDIT VALUE MODEL

(71) Applicant: Chime Financial, Inc., San Francisco, CA (US)

(72) Inventors: Aaron Plante, Delray Beach, FL (US); Aditya Narula, San Jose, CA (US); Akhil Naini, New York, NY (US); Aoni Wang, Redwood City, CA (US); Baishi Wu, Cambridge, MA (US); Brooke Fraser, San Francisco, CA (US); Emily Bernier, San Francisco, CA (US); James Sheak, San Mateo, CA (US); Matt McCormick, San Francisco, CA (US); Paola Heneine, San Francisco, CA (US); Rakesh Vemulapally, Foster City, CA (US); Robert Luedeman, San Francisco, CA (US); Shashank Gadda, Dublin, CA (US); Victoria Palmiotto, Oakland, CA (US)

(73) Assignee: Chime Financial, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/574,391

(22) Filed: Jan. 12, 2022

(51) Int. Cl.
*G06Q 40/02* (2012.01)
*H04L 67/04* (2022.01)

(52) U.S. Cl.
CPC .......... *G06Q 40/025* (2013.01); *H04L 67/04* (2013.01)

(58) Field of Classification Search
None
See application file for complete search history.

(56) References Cited

U.S. PATENT DOCUMENTS 10,832,319 B1 * 11/2020 Lister .................... G06Q 40/00
11,145,005 B2 * 10/2021 Brock .................... G06Q 20/02
(Continued)

OTHER PUBLICATIONS

Lunden, "Amex acquires Softbank-backed Kabbage after tough 2020 for the SMB lender", TechCrunch, Aug. 17, 2020. (Year: 2020).*

*Primary Examiner* — Abdulmajeed Aziz

(57) ABSTRACT

The disclosure describes embodiments of systems, methods, and non-transitory computer readable storage media that utilize a machine learning model and a credit value model to generate user interface elements that present credit values and credit value conditions in real time for user accounts. For instance, the disclosed systems can generate an activity score using an activity machine learning model with internal user activity data of a user account. Then, utilizing a credit value model with the activity score and a user activity condition, the disclosed systems can determine a dynamic credit value range for the user account. Indeed, the disclosed systems can display user interface elements with selectable credit values from the dynamic credit value range. Additionally, the disclosed systems can utilize the credit value model to determine and display one or more dynamic credit value conditions for a selected credit value received from the selectable credit values.

20 Claims, 22 Drawing Sheets

(56) References Cited

U.S. PATENT DOCUMENTS

| | | | |
|---|---|---|---|
| 2014/0067650 A1* | 3/2014 | Gardiner | G06Q 40/025 705/38 |
| 2014/0156411 A1* | 6/2014 | Murgai | G06Q 30/0251 705/14.66 |
| 2016/0171555 A1* | 6/2016 | Buerger | G06Q 40/025 705/14.66 |
| 2017/0004573 A1* | 1/2017 | Hussain | G06F 21/552 |
| 2021/0326881 A1* | 10/2021 | Handelman | G06N 20/00 |

* cited by examiner

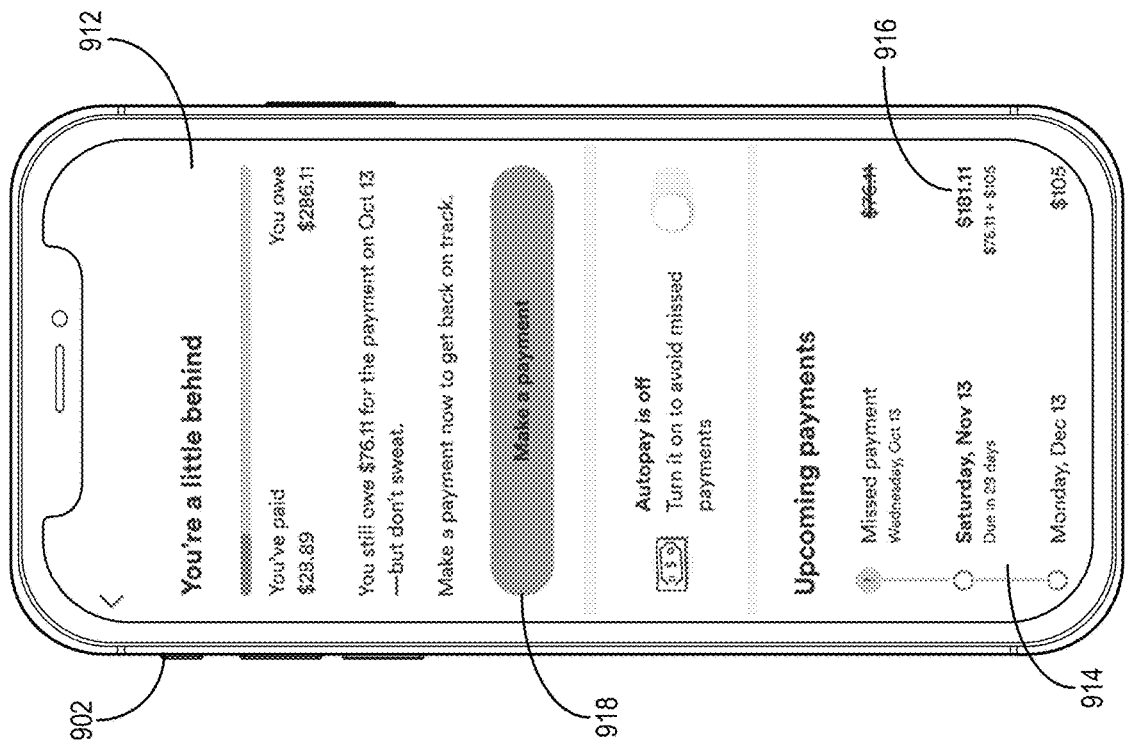
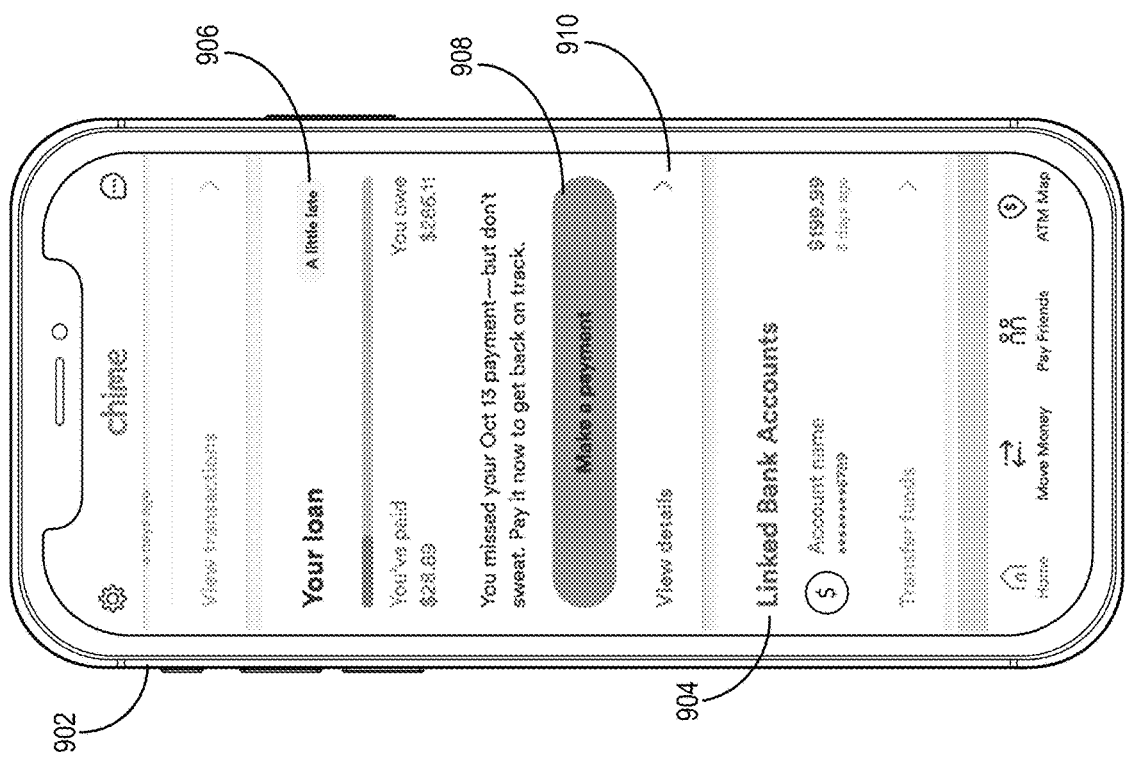
Fig. 9B
Fig. 9A

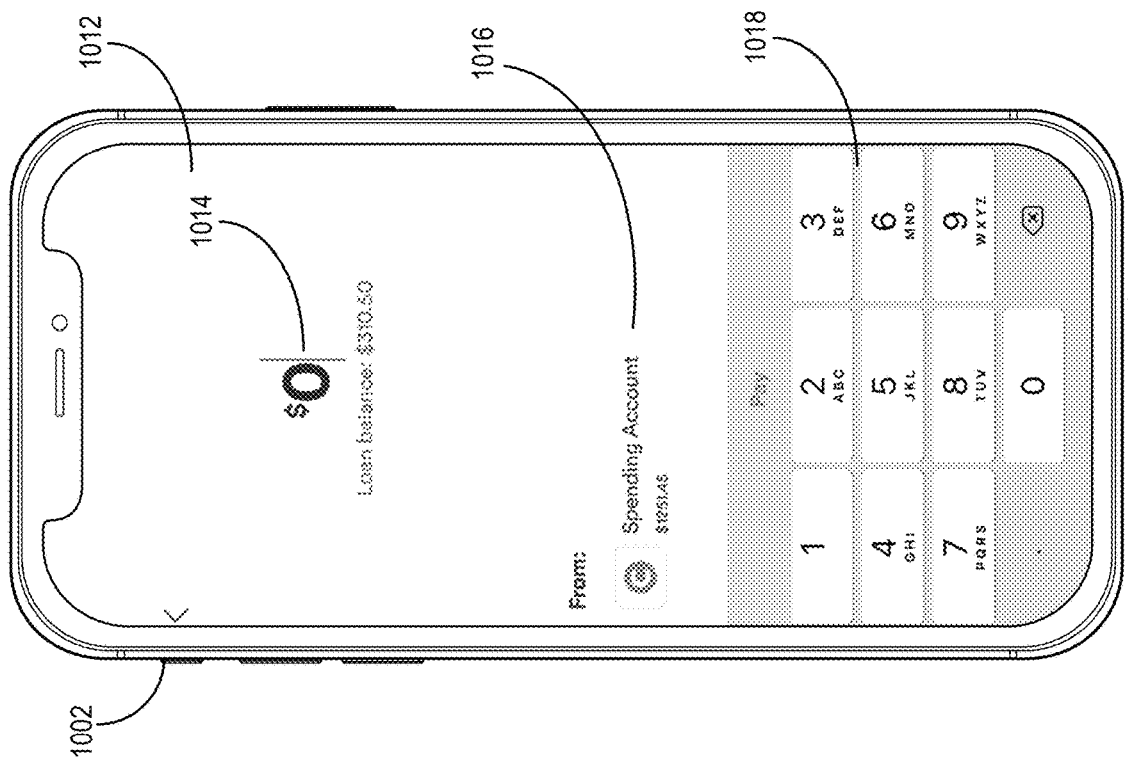
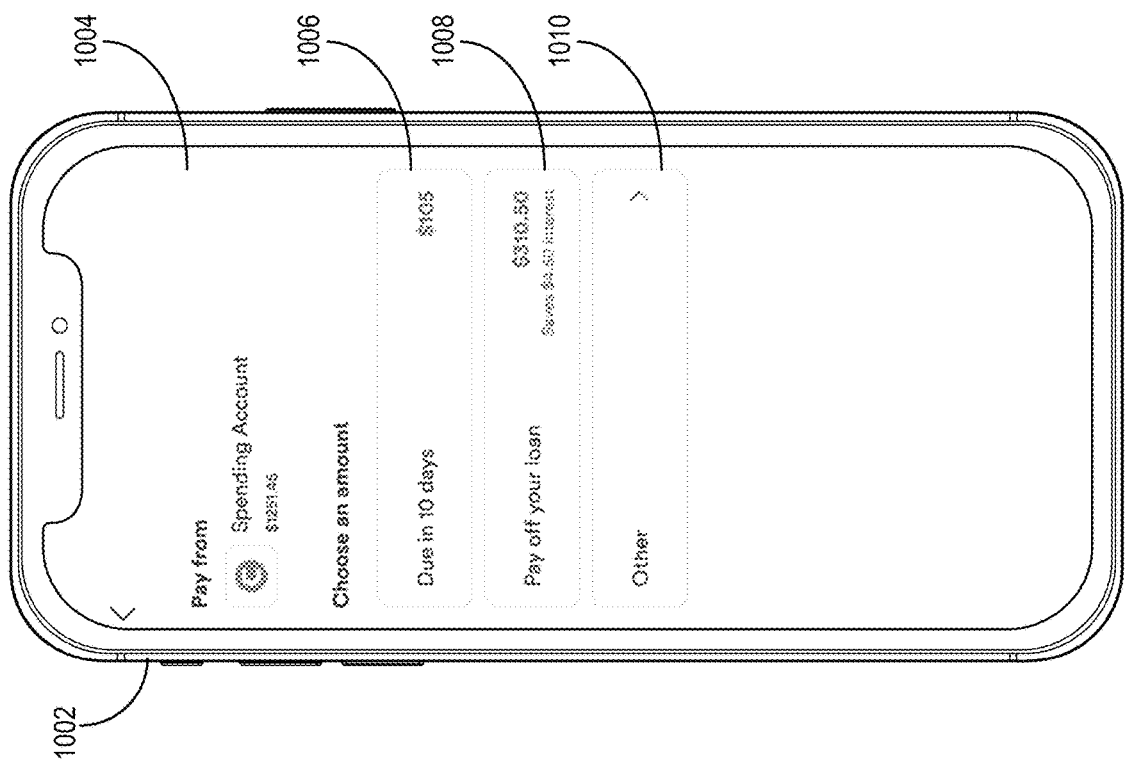
Fig. 10B
Fig. 10A

| Name | Monthly | Biweekly (§14 day) | Weekly (§14 day) | Biweekly (§14 day) | Weekly (§14 day) |
|---|---|---|---|---|---|
| Loan Amount | $300 | $300 | $300 | $300 | $300 |
| Number of Payments | 3 | 6 | 12 | 6 | 12 |
| Number of Days | 90 | 91 | 84 | 91 | 84 |
| Normal Payment | $105 | $52.5 | $26.25 | $52.5 | $26.25 |
| Last Payment | $105 | $50.80 | $23.69 | $49.13 | $23.90 |
| APR | 29.76% | 29.76% | 29.76% | 29.76% | 29.76% |
| Total Fee/Interest | $15 | $13.30 | $12.44 | $11.65 | $10.65 |
| Savings | 0% | 11% | 17% | 22% | 29% |

US 11,386,490 B1

GENERATING GRAPHICAL USER INTERFACES COMPRISING DYNAMIC CREDIT VALUE USER INTERFACE ELEMENTS DETERMINED FROM A CREDIT VALUE MODEL

BACKGROUND

Recent years have seen a significant development in systems that utilize web-based and mobile-based applications to manage user accounts and digital information for user accounts in real time. For instance, many conventional systems provide various graphical user interfaces (GUIs) to present digital information and options to client devices within applications of mobile devices (or other computing devices). Although conventional systems attempt to determine and communicate digital information to user accounts on web-based and mobile-based applications, such conventional systems face a number of technical shortcomings, particularly with regard to easily, efficiently, and accurately determining and displaying outputs from computer-based models for account-specific values corresponding to a user account.

For instance, many conventional systems utilize rigid approaches that require multiple user interfaces to coherently present information corresponding to account-specific values within limited screen spaces of GUIs in mobile devices. In many conventional systems, limitations of screen space in mobile devices prevent GUIs from seamlessly presenting a large amount of information for outputs of computer-based models without navigating between an excessive number of user interfaces. In addition, conventional systems also often cannot easily receive changes to account-specific values from user interactions and accordingly determine and update information related to the changed account-specific values within the GUIs (in real time).

Moreover, many conventional systems inefficiently utilize computational resources because of excessive navigation between user interfaces to present the above-mentioned information correctly within small screens of mobile devices. In addition, in order to determine and provide accurate information for the account-specific values, conventional systems oftentimes interface with multiple third-party sources. In many cases, such conventional systems utilize a significant amount of computational resources such as processing time, API protocol updates and synchronization, and network bandwidth to communicate with the multiple third-party sources to determine and update information related to account-specific values within the GUIs in real time.

Furthermore, many conventional systems are unable to accurately determine account-specific values or limits through computer models. For example, conventional systems fail to accurately determine account-specific limits that accurately reflect underlying risks based on numerous factors or variables corresponding to digital accounts. Indeed, as mentioned above, conventional systems often have to inflexibly rely on multiple third-party sources to accurately determine account-specific values or limits through computer models.

SUMMARY

This disclosure describes one or more embodiments of systems, methods, and non-transitory computer readable media that provide benefits and solve one or more of the foregoing or other problems by utilizing a machine learning model and a credit value model to generate user interface elements that dynamically present account-specific credit values and dynamic credit value conditions in real time for user accounts. For instance, the disclosed systems can generate an activity score using an activity machine learning model with internal user activity data of a user account. Then, utilizing a credit value model with the activity score and a user activity condition from the user account, the disclosed systems can determine a dynamic credit value range for the user account. Indeed, the disclosed systems can display, within a computing device, user interface elements with selectable credit values from the dynamic credit value range. In addition, the disclosed systems can also utilize the credit value model to determine and display one or more dynamic credit value conditions (in real time) for a selected credit value received from the selectable credit values from the computing device.

BRIEF DESCRIPTION OF THE DRAWINGS

The detailed description is described with reference to the accompanying drawings in which:

FIGS. 7A-7G illustrate graphical user interfaces for presenting credit values and credit value conditions in accordance with one or more implementations.

FIGS. 9A and 9B illustrate graphical user interfaces for tracking a credit value for late transactions in accordance with one or more implementations.

FIGS. 10A-10E illustrate graphical user interfaces for transaction options with a credit value in accordance with one or more implementations.

DETAILED DESCRIPTION

Figure 1:
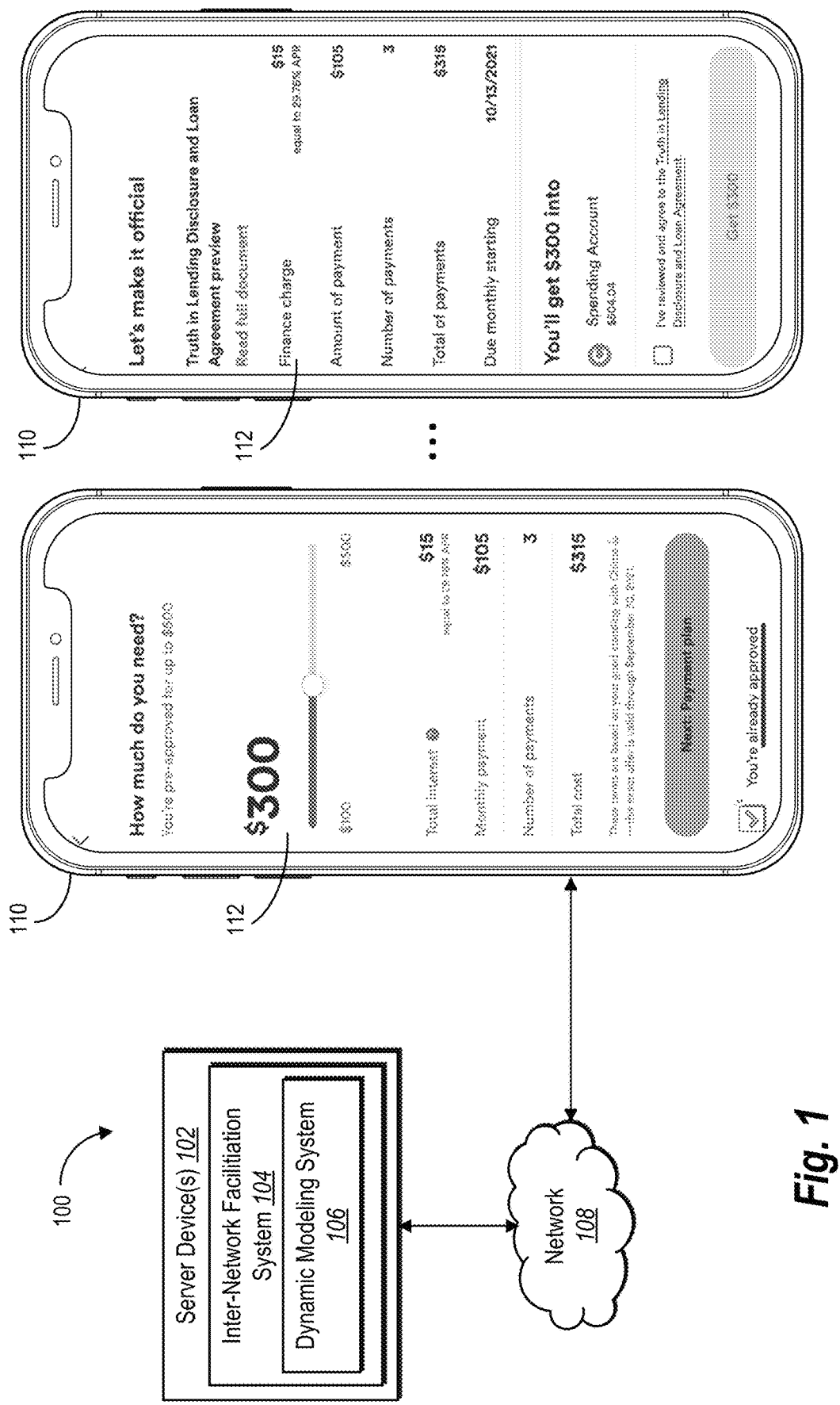
FIG. 1 illustrates a schematic diagram of an environment for implementing an inter-network facilitation system and a dynamic modeling system in accordance with one or more implementations.

The disclosure describes one or more embodiments of a dynamic modeling system that utilizes a machine learning model and a dynamic credit value model to generate user interface elements that dynamically present account-specific credit values and dynamic credit value conditions. For instance, the dynamic modeling system utilizes data corresponding to the user account with an activity machine learning model to generate an activity score for the user account. Subsequently, the dynamic modeling system utilizes a credit value model to determine a dynamic credit value range and dynamic credit value conditions for different credit values in the dynamic credit value range from the activity score and one or more user activity conditions. Indeed, the dynamic modeling system can display, within a GUI of a client device, the dynamic credit value range with selectable credit values and one or more dynamic credit value conditions (in real time) for a selected credit value received from the selectable credit values from the client device.

To illustrate, in one or more embodiments, the dynamic modeling system utilizes user activity data of a user account with an activity machine learning model to generate an activity score indicating a risk level for the user account. Indeed, in one or more embodiments, the dynamic modeling system utilizes an activity machine learning model that includes one or more decision trees for user activity data and the effect the user activity data has on the activity score of the user account. Furthermore, in some cases, the dynamic modeling system selects from between multiple activity machine learning models based on a user activity duration associated with the user account.

In addition, the dynamic modeling system can determine a credit value and credit value condition from an activity score (and user activity condition) utilizing a credit value model. In one or more embodiments, the dynamic modeling system utilizes a credit value model that includes an offer category matrix and a credit value matrix. Indeed, the dynamic modeling system can utilize the user activity score and user activity condition to determine an offer category for the user account. Then, in one or more embodiments, the dynamic modeling system utilizes the determined offer category to determine a dynamic credit value range for the user account from a credit value matrix that includes mappings between offer categories and dynamic credit values. In addition, the dynamic modeling system can also utilize the credit value matrix to identify one or more credit value conditions associated with a particular credit value from the credit value matrix.

Moreover, in some embodiments, the dynamic modeling system generates and displays user interface elements to flexibly and efficiently present dynamic credit values and dynamic credit value conditions for a user account that are determined using a credit value model (in real time). For example, the dynamic modeling system can determine and display, within a GUI, a user interface element that includes selectable credit values from a dynamic credit value range. Then, upon receiving a selection of a particular credit value from the dynamic credit value range, the dynamic modeling system can display one or more credit value conditions that are specifically determined for the particular credit value utilizing the credit value model. In some cases, the dynamic modeling system also updates and displays the one or more credit value conditions based on changes to the selection within the dynamic credit value range.

The dynamic modeling system can provide numerous advantages, benefits, and practical applications relative to conventional systems. For instance, the dynamic modeling system can generate flexible user interfaces that coherently present information in limited screen spaces of GUIs. In particular, the dynamic modeling system can determine and provide information in a reduced number of user interfaces by using a range of credit values and dynamic credit value conditions that change in real time according to the selected credit value (as determined using a credit value model). Furthermore, the dynamic modeling system can also utilize internal data to flexibly determine and provide a credit value range and credit value conditions from the credit value model and activity machine learning model with less reliance on third-party sources.

In addition to flexibility, the dynamic modeling system also efficiently utilizes space in small screens of mobile devices. Indeed, by determining and providing accurate credit value ranges and accompanying credit value conditions within a reduced number of user interfaces as describe above, the dynamic modeling system can, unlike many conventional systems, also efficiently reduce the computing resources needed to navigate between an excessive number of user interfaces.

Furthermore, in contrast to many conventional systems that interface with multiple third-party sources to determine account-specific values and information related to the account-specific values, the dynamic modeling system utilizes the activity machine learning model and the credit value model with internal data to accurately generate credit value ranges and credit value conditions for user accounts. In turn, in one or more embodiments, the dynamic modeling system can determine and display determined credit values and credit value conditions with reduced processing times, API protocol updates and synchronizations, and/or network bandwidth with third-party sources to determine and update information related to selected credit values within a graphical user interface (in real time).

Moreover, the dynamic modeling system can accurately determine account-specific values reflecting risk associated with user accounts. More specifically, in some cases, the dynamic modeling system utilizes multiple activity machine learning models that are specifically trained for a category of user accounts. Indeed, by utilizing and emphasizing a varying set of user activity data variables for different types of user accounts, the dynamic modeling system improves the accuracy of determined metrics associated with a diverse range of user accounts. Additionally, by utilizing the accurately determined metrics associated with a diverse range of user accounts with a credit value model, the dynamic modeling system also improves the accuracy of output credit value ranges and credit value conditions for the diverse range of user accounts. Indeed, in some instances, the dynamic modeling system maintains accuracy through the accurately determined metrics associated with the diverse range of user accounts and the credit value model without having to rely on third-party sources to determine the output credit value ranges and credit value conditions.

As indicated by the foregoing discussion, the present disclosure utilizes a variety of terms to describe features and advantages of the dynamic modeling system. As used herein, the term "machine learning model" refers to a computer model that can be trained (e.g., tuned or learned) based on inputs to approximate unknown functions and corresponding outputs. As an example, a machine learning model can include, but is not limited to, a neural network (e.g., a convolutional neural network, recurrent neural network, or deep learning model), a decision tree (e.g., a gradient boosted decision tree, a random forest decision tree, a decision tree with variable or output probabilities), and/or a support vector machine.

Furthermore, as used herein, the term "activity machine learning model" refers to a machine learning model that can be trained to predict (or determine) an activity score for a user. In particular, an activity machine learning model can analyze input user account activity data corresponding to a user account to generate (or predict) an activity score for the user account. In some embodiments, the activity machine learning model includes a decision tree that generate probabilities for activity scores from various variables corresponding to various characteristics from user account activity data. Indeed, in one or more embodiments, the dynamic modeling system utilizes the probabilities corresponding to the various activity scores to select (or determine) an activity score for the user account. Additionally, in one or more embodiments, the dynamic modeling system can train multiple activity machine learning models to specifically generate activity scores for a category of user accounts (e.g., based on account activity duration). Indeed, in one or more embodiments, the dynamic modeling system utilizes an activity machine learning model as described in U.S. application Ser. No. 17/519,129, filed Nov. 4, 2021, entitled GENERATING USER INTERFACES COMPRISING DYNAMIC BASE LIMIT VALUE USER INTERFACE ELEMENTS DETERMINED FROM A BASE LIMIT VALUE MODEL, the contents of which are herein incorporated by reference in their entirety.

As used herein, the term "base limit value" refers to a numerical value that represents an excess utilization buffer for a user account. In particular, the base limit value can include a numerical value that represents an amount that a user account is permitted to obtain or transact in excess of an amount belonging to the user account. As an example, a base limit value can include a monetary overdraft amount.

As used herein, the term "activity score" refers to a value indicating a rating for a user account. In some embodiments, the activity score indicates a risk level corresponding to a user account. For example, the dynamic modeling system can utilize the activity score of a user account generated from an activity machine learning model to determine a credit value utilization risk level for the user account. Indeed, the activity score of a user account can indicate the likelihood of a user account failing to pay off a credit value amount utilized by the user account.

As used herein, the term "user activity data" refers to information (or data) associated with interactions of a user (e.g., interactions with the dynamic modeling system or a corresponding client device application). For example, user activity data can include actions, durations corresponding to actions, frequencies of actions, account values, and/or other representations of interactions of a user corresponding to a user account on a client application (e.g., operating a client application as shown in FIG. 1). To illustrate, user activity data can include, but is not limited to, historical utilization of an application, a duration of satisfying a threshold account value (e.g., an amount of time that a user account satisfies a threshold account value within the user account), historical transaction activity within the user account, historical credit value utilization, credit value payoff times for the user account, historical base limit value utilization, historical flagged activities for the user account, and/or a number of declined transactions corresponding to the user account. In one or more embodiments, the dynamic modeling system utilizes internal user activity data by utilizing user activity data that is obtained from interactions with an application corresponding to the dynamic modeling system (e.g., without requesting user data for a user of the user account from a third party network and without user input from the user).

As used herein, the term "credit value" refers to a numerical value that represents an accessible lending value for a user account. In particular, the credit value can include a numerical value that represents an amount that a user account is permitted to obtain or transact from a third-party account in excess to an amount belonging to the user account. As an example, a credit value can include a monetary loan or a line of credit that is provided to the user account. In some instances, the term "credit value range" refers to a set of credit values (e.g., a minimum and maximum credit value) that is accessible to a user account as determined by a credit value model.

As user herein, the term "credit value condition" refers to one or more terms that are required to access a credit value within a user account. For example, a credit value condition can include a numerical value that represents an additional cost to access the credit value within the user account. In some cases, the credit value condition can include a time period that represents a scheduled payoff time for the accessed credit value. As an example, a credit value condition can include an interest fee or percentage corresponding to a monetary loan or a line of credit that is provided to the user account.

As used herein, the term "user activity condition" refers to a benchmark action from a user account that causes a change in a credit value or credit value condition corresponding to the user account. In particular, the user activity condition can include a conditional action that upon performance from a user account results in a change (or assignment) of a credit value or credit value condition for the user account. As an example, the user activity condition can include a deposit transaction activity (e.g., a user account transaction that adds a monetary value within the user account), a deposit transaction amount, a frequency of a deposit transaction, and/or a user-to-user transaction activity.

As used herein, the term "credit value model" refers to a model that determines (and/or outputs) a credit value for a user account from an activity score and a user activity data (such as a user activity condition). For instance, a credit value model can include mappings of information between user activity scores, user activity conditions, credit values, and/or credit value conditions. In some embodiments, the credit value model includes a machine learning model and/or a model (or representation) generated through a machine learning model that maps user activity scores, user activity conditions, credit values (or credit value ranges), and/or credit value conditions to output credit values and/or user activity conditions based on input user activity scores and/or other user activity data.

In some embodiments, the credit value model includes an offer category matrix. In particular, an offer category matrix can include mappings of activity scores and user activity conditions to offer categories. Indeed, an offer category can include a grouping, labeling, or bucket that indicates a grouping or type of credit value and/or credit value conditions accessible to a user account. In addition, the credit value model can include a credit value matrix. In one or more embodiments, the credit value matrix includes mappings between offer categories and one or more credit values. Moreover, the credit value matrix can also include credit value condition elements that correspond to one or more credit values and/or offer categories. For instance, the dynamic modeling system can utilize a determined offer category (from an offer category matrix) to identify one or more credit values (as a dynamic credit value range) and one or more dynamic credit value conditions from the credit value condition elements that map to the offer category and identified one or more credit values in the credit value matrix.

Turning now to the figures, FIG. 1 illustrates a block diagram of a system 100 (or system environment) for implementing an inter-network facilitation system 104 and a dynamic modeling system 106 in accordance with one or more embodiments. As shown in FIG. 1, the system 100 includes server device(s) 102 (which includes an inter-network facilitation system 104 and the dynamic modeling system 106), client device 110, and a network 108. As further illustrated in FIG. 1, the server device(s) 102 and the client device 110 can communicate via the network 108. Although FIG. 1 illustrates the dynamic modeling system 106 being implemented by a particular component and/or device within the system 100, the dynamic modeling system 106 can be implemented, in whole or in part, by other computing devices and/or components in the system 100 (e.g., the client device 110). Additional description regarding the illustrated computing devices (e.g., the server device(s) 102, the client device 110, and/or the network 108) is provided with respect to FIGS. 13 and 14 below.

As shown in FIG. 1, the server device(s) 102 can include the inter-network facilitation system 104. In some embodiments, the inter-network facilitation system 104 can determine, store, generate, and/or display financial information corresponding to a user account (e.g., a banking application, a money transfer application). Furthermore, the inter-network facilitation system 104 can also electronically communicate (or facilitate) financial transactions between one or more user accounts (and/or computing devices). Moreover, the inter-network facilitation system 104 can also track and/or monitor financial transactions and/or financial transaction behaviors of a user within a user account.

Indeed, the inter-network facilitation system 104 can include a system that comprises the dynamic modeling system 106 and that facilitates financial transactions and digital communications across different computing systems over one or more networks. For example, an inter-network facilitation system manages credit accounts, secured accounts, and other accounts for a single account registered within the inter-network facilitation system. In some cases, the inter-network facilitation system is a centralized network system that facilitates access to online banking accounts, credit accounts, and other accounts within a central network location. Indeed, the inter-network facilitation system can link accounts from different network-based financial institutions to provide information regarding, and management tools for, the different accounts.

Furthermore, the dynamic modeling system 106 can utilize a machine learning model and a dynamic credit value model to determine an account-specific dynamic credit value range and dynamic credit value conditions for the dynamic credit value range. Indeed, as mentioned above, the dynamic modeling system 106 can utilize an activity machine learning model to determine an activity score for a user account and utilize the activity score with user activity conditions to determine the dynamic credit value range (and credit value conditions) from a credit value model. Moreover, the dynamic modeling system 106 can also display, within a GUI of a client device, the dynamic credit value range with selectable credit values and dynamic credit value conditions (in real time) for a selected credit value received from the selectable credit values from the client device (in accordance with one or more embodiments).

As also illustrated in FIG. 1, the system 100 includes the client device 110. For example, the client device 110 may include, but is not limited to, a mobile device (e.g., smartphone, tablet) or other type of computing device, including those explained below with reference to FIG. 13. Additionally, the client device 110 can include a computing device associated with (and/or operated by) user accounts for the inter-network facilitation system 104. Moreover, although FIG. 1 illustrates a single client device (e.g., client device 110), the system 100 can include various numbers of client devices that communicate and/or interact with the inter-network facilitation system 104 and/or the dynamic modeling system 106.

Furthermore, as shown in FIG. 1, the client device 110 includes a client application 112. The client application 112 can include instructions that (upon execution) cause the client device 110 to perform various actions. For example, as shown in FIG. 1, a user of a user account can interact with the client application 112 on the client device 110 to access financial information, initiate a financial transaction, and/or select (or utilize) a credit value displayed within the client application 112. In addition, the client application 112 can provide user data activity to the dynamic modeling system 106 (via the server device(s) 102) to generate activity scores and/or credit values for a user account.

In certain instances, the client device 110 corresponds to one or more user accounts (e.g., user accounts stored at the server device(s) 102). For instance, a user of a client device can establish a user account with login credentials and various information corresponding to the user. In addition, the user accounts can include a variety of information regarding financial information and/or financial transaction information for users (e.g., name, telephone number, address, bank account number, credit amount, debt amount, financial asset amount), payment information, transaction history information, and/or contacts for financial transactions. In some embodiments, a user account can be accessed via multiple devices (e.g., multiple client devices) when authorized and authenticated to access the user account within the multiple devices.

The present disclosure utilizes client devices to refer to devices associated with such user accounts. In referring to a client (or user) device, the disclosure and the claims are not limited to communications with a specific device, but any device corresponding to a user account of a particular user. Accordingly, in using the term client device, this disclosure can refer to any computing device corresponding to a user account of an inter-network facilitation system.

As further shown in FIG. 1, the system 100 includes the network 108. As mentioned above, the network 108 can enable communication between components of the system 100. In one or more embodiments, the network 108 may include a suitable network and may communicate using a various number of communication platforms and technologies suitable for transmitting data and/or communication signals, examples of which are described with reference to FIG. 13. Furthermore, although FIG. 1 illustrates the server device(s) 102 and the client device 110 communicating via the network 108, the various components of the system 100 can communicate and/or interact via other methods (e.g., the server device(s) 102 and the client device 110 can communicate directly).

Figure 2:
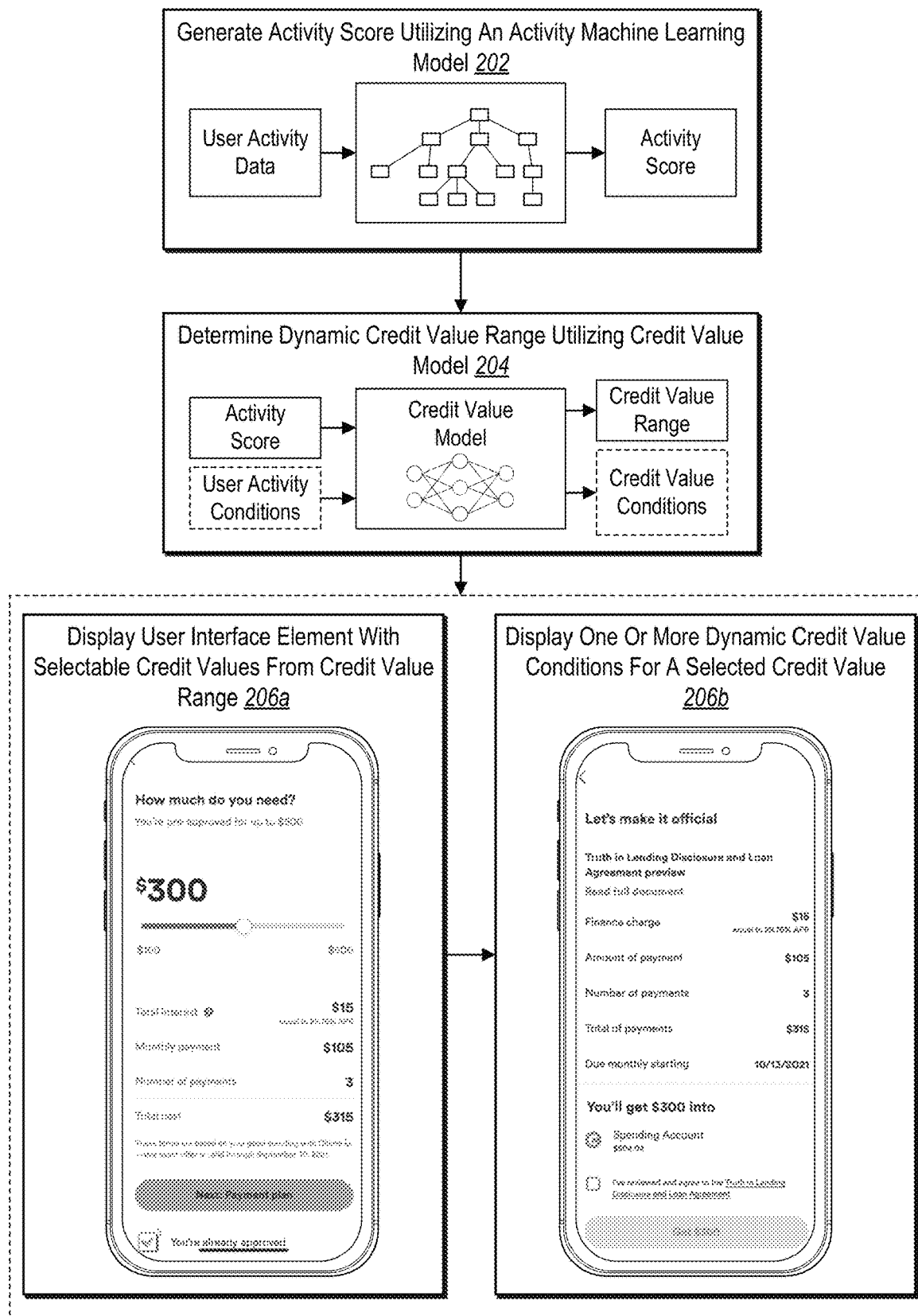
FIG. 2 illustrates an overview of a dynamic modeling system determining a dynamic credit value range and dynamic credit value conditions in accordance with one or more implementations.

As mentioned above, the dynamic modeling system 106 utilizes a machine learning model and a dynamic credit value model to generate user interface elements that dynamically present account-specific credit values and dynamic credit value conditions. For example, FIG. 2 illustrates an overview of the dynamic modeling system 106 determining a dynamic credit value range and dynamic credit value conditions. Additionally, FIG. 2 also illustrates an overview of the dynamic modeling system 106 displaying (within a GUI of a client device) the dynamic credit value range with selectable credit values and one or more dynamic credit value conditions for a selected credit value received from the selectable credit values from the client device.

As shown in act 202 of FIG. 2, the dynamic modeling system 106 generates an activity score utilizing an activity machine learning model. In particular, as shown in the act 202 of FIG. 2, the dynamic modeling system 106 utilizes user activity data with an activity machine learning model to generate an activity score. For example, the machine learning model can include a neural network and/or a decision tree model, such as a gradient boosted decision tree (e.g., CatBoost) or a random forest decision tree. Additional detail regarding the dynamic modeling system 106 generating an activity score from an activity machine learning model is described below (e.g., in relation to FIG. 3).

Furthermore, as shown in act 204 of FIG. 2, the dynamic modeling system 106 determines a dynamic credit value range utilizing a credit value model. Indeed, as shown in the act 204 of FIG. 2, the dynamic modeling system 106 utilizes the activity score (and user activity conditions) with a credit value model to determine a credit value range. In addition, as shown in the act 204 of FIG. 2, the dynamic modeling system 106 also utilizes the credit value model to determine credit value conditions. Additional detail regarding the dynamic modeling system 106 utilizing a credit value model to determine credit values and credit value conditions is provided below (e.g., in relation to FIGS. 4 and 5).

Additionally, as illustrated in act 206a of FIG. 2, the dynamic modeling system 106 displays a user interface element with selectable credit values from the credit value range. In some cases, as shown in the act 206a of FIG. 2, the dynamic modeling system 106 can display one or more credit value conditions (that dynamically update based on different selections of the selectable credit values) within the same user interface. Additionally, as shown in the transition from the act 206a to an act 206b of FIG. 2, the dynamic modeling system 106 displays one or more credit value conditions for a selected credit value (e.g., a selection received within the user interface of the act 206a). Additional detail regarding the dynamic modeling system 106 displaying (within a GUI of a client device) the dynamic credit value range with selectable credit values and one or more dynamic credit value conditions for a selected credit value is provided below (e.g., in relation to FIGS. 6A-6D, 7A-7G, 8A-8D, 9A-9B, 10A-10E).

Figure 3:
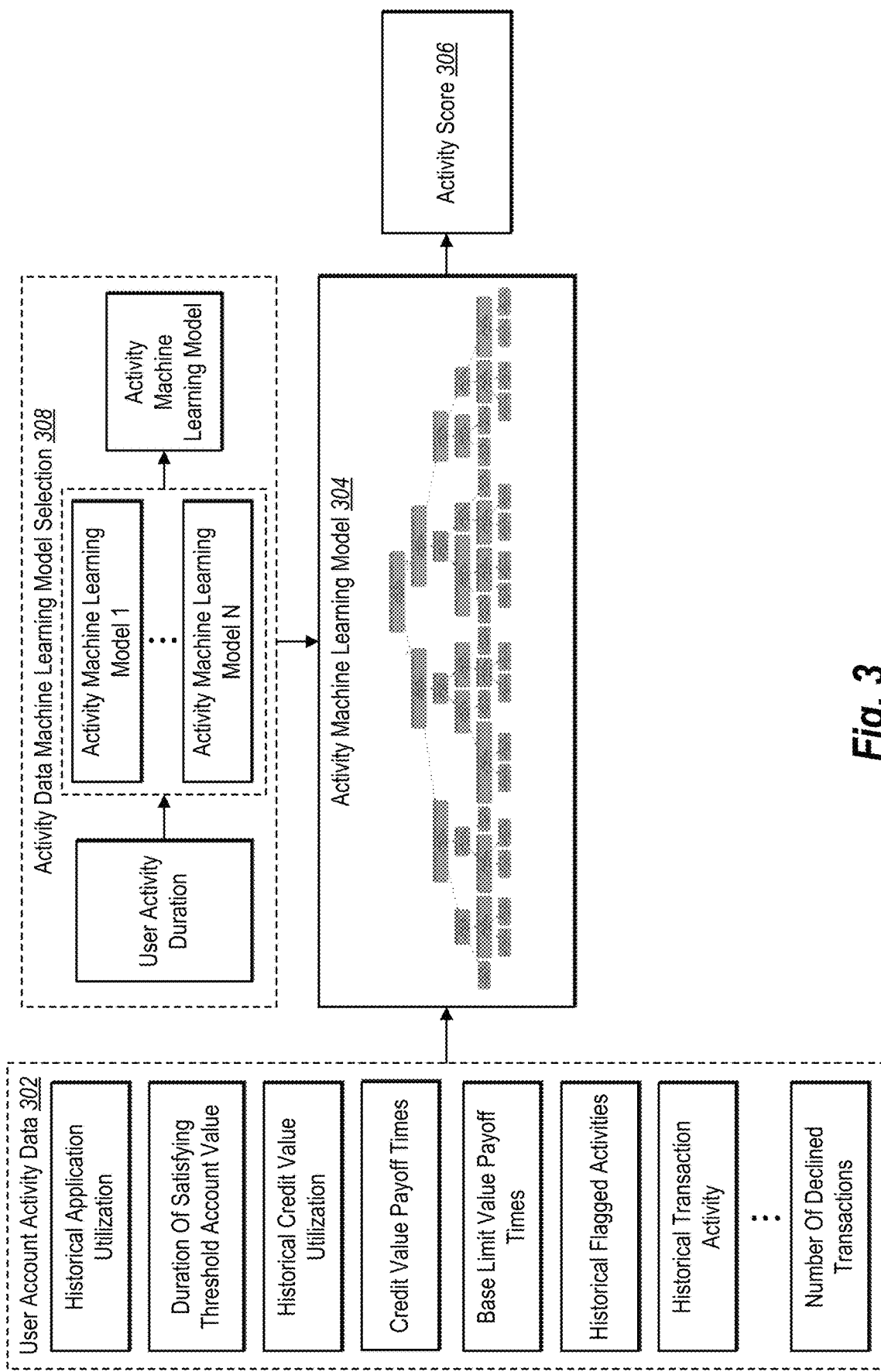
FIG. 3 illustrates a dynamic modeling system generating an activity score utilizing an activity machine learning model in accordance with one or more implementations.

As previously mentioned, the dynamic modeling system 106 can generate an activity score for a user account utilizing an activity machine learning model. For example, FIG. 3 illustrates the dynamic modeling system 106 generating an activity score utilizing an activity machine learning model with user account activity data of a user account. As shown in FIG. 3, the dynamic modeling system 106 utilizes user account activity data 302 with an activity machine learning model 304 to generate an activity score. In particular, as shown in FIG. 3, the dynamic modeling system 106 utilizes variables from the user account activity data 302 with a decision tree model of the activity machine learning model 304 to determine an activity score (e.g., the activity score 306) that accurately corresponds to the combination of variable information for the user account activity data 302.

As illustrated in FIG. 3, the dynamic modeling system 106 can utilize various types of variables for the user account activity data 302. For instance, as shown in FIG. 3, the user account activity data 302 can include historical application utilization, a duration of satisfying a threshold account value, historical credit value utilization, credit value payoff times, base limit values and/or base limit value payoff times, historical flagged activities, historical transaction activity, and/or a number of declined transactions. As an example, the dynamic modeling system 106 can utilize historical application utilization data that indicate historical actions of a user account. For example, the historical application utilization data can include, but is not limited to, a number of application logins, application features utilized by a user of a user account, and/or a frequency corresponding to the utilized features.

In addition, the dynamic modeling system 106 can utilize a duration of satisfying a threshold account value from a user account. In particular, the duration of satisfying a threshold account value can include an amount of time (e.g., days, months, and/or years) that a user account has maintained an account value (e.g., an account balance) that is equal to or above a particular threshold account value. In addition, the dynamic modeling system 106 can utilize a historical credit value utilization. In one or more embodiments, the dynamic modeling system 106 can utilize the historical credit value utilization to indicate the amount, frequency, and times (e.g., dates, times of day) that a user account has utilized a provided credit value. Additionally, the dynamic modeling system 106 can utilize credit value payoff times from a user account that indicates times (e.g., dates, times of day) of transactions that pay a utilized credit value amount within a user account.

In some cases, the dynamic modeling system 106 further utilizes base limit values and/or base limit value payoff times. In particular, the dynamic modeling system 106 can utilize base limit value payoff times from a user account that indicates times (e.g., dates, times of day) of transactions that pay a utilized base limit value amount within a user account. In some embodiments, the dynamic modeling system 106 can also utilize a historical base limit value utilization to indicate the amount, frequency, and times (e.g., dates, times of day) that a user account has utilized a provided base limit value. Indeed, in one or more embodiments, the dynamic modeling system 106 utilizes a base limit value payoff time, historical base limit value utilization, or other information from a base limit value (e.g., base limit value selections, base limit value determinations) as described in U.S. application Ser. No. 17/519,129.

Furthermore, the dynamic modeling system 106 can utilize historical flagged activities as user account activity data for an activity machine learning model. As an example, a historical flagged activity can include flags (or notes) corresponding to a user account that indicates various identified activities of the user account such as, but not limited to, a flag indicating fraudulent activity, a flag indicating historical bans and/or blacklists of a user account, and/or previous penalties associated with a user account. In addition, the historical flagged activities can include third party reports on a user account that identifies (or indicates) fraudulent, malicious, and/or other security related activities or actions taken by a user of the user account.

Additionally, the dynamic modeling system 106 can also utilize historical transaction activities as user account activity data. In some embodiments, the dynamic modeling system 106 identifies previous transactions with merchants, services, persons, and/or other users of the inter-network facilitation system as historical transaction activities. In certain instances, the dynamic modeling system 106 utilizes a transaction type (e.g., utilities, shopping, travel, fitness) associated with the transaction as part of the historical transaction activity. In some cases, the dynamic modeling system 106 utilizes various combinations of at least the timing corresponding to the historical transaction activity (e.g., dates, time of days, time), the recipient or sender of the transactions, and/or transaction amounts as part of historical transaction activities.

In addition, the dynamic modeling system 106 can also utilize a number of declined transactions as user account activity data. For example, the dynamic modeling system 106 a number of declined transactions to indicate a number of times a user account has had a declined transaction (e.g., due to insufficient funds, fraud alerts). In one or more embodiments, the dynamic modeling system 106 utilize such user account activity data from internal data that is available to the dynamic modeling system 106 from user interactions with the dynamic modeling system 106 and/or inter-network facilitation system 104.

Although one or more embodiments describe the dynamic modeling system 106 utilizing particular types of user account activity data, the dynamic modeling system 106 can utilize various user account activity data variables within an activity machine learning model to generate an activity score. In particular, the dynamic modeling system 106 can utilize numerous variables (e.g., hundreds, thousands) corresponding to various categories such as, but not limited to, activity logs of a user account sessions, user account balances, user account transactions, user account income and/or occupation information, geographic location information, financial products (e.g., credit cards, loans) associated with the user account, contact information associated with a user account (e.g., phone numbers, email addresses), user account spending and/or transaction behaviors.

As shown in FIG. 3, the dynamic modeling system 106 utilizes an activity score decision tree as the activity machine learning model. In one or more embodiments, the dynamic modeling system 106 utilizes an activity machine learning model comprising an activity score decision tree that includes various user account activity data variables that branch based on the user account activity data satisfying (or not satisfying) the thresholds generated for the various user account activity data variables. Then, based on satisfying (or not satisfying) the thresholds corresponding to the user account activity data variables, the dynamic modeling system 106 can determine the effect the branching user account activity data variables contributes to a risk score (or value) of a user account (e.g., in terms of a risk percentage).

To illustrate, the dynamic modeling system 106 can utilize an activity score decision tree to determine whether data of a user account (e.g., activity data) satisfies a threshold for a first node of the decision tree. Based on whether the user account satisfies the threshold for the first node, the dynamic modeling system 106 can track a risk score for the user account and further traverse to subsequent nodes to check other user activity data variables. Indeed, at each node of the decision tree, the dynamic modeling system 106 can adjust the risk score of the user account based on whether the user account activity data satisfies the thresholds for the user activity data variable at the particular node.

As an example, at a first node of the decision tree, the dynamic modeling system 106 can identify whether an account balance of a user account has been above a threshold balance amount for a threshold number of days. In some instances, upon determining that the account balance of the user account does satisfy the threshold balance amount and the threshold number of days, the dynamic modeling system 106 can subsequently traverse to a node of the activity score decision tree that does not increase the risk score of the user account. On the other hand, upon determining that the account balance of the user account does not satisfy the threshold balance for the threshold number of days, the dynamic modeling system 106 can subsequently traverse to a node of the activity score decision tree that increases the risk score of the user account. In addition, the dynamic modeling system 106 can further analyze another user activity data variable at the subsequent nodes to further determine increases (and/or decreases) in a risk score for the user account.

In one or more embodiments, the dynamic modeling system 106 outputs an activity score that indicates a numerical value within a predetermined range based on the risk score (or another value) of the decision tree of the activity machine learning model. For instance, the dynamic modeling system 106 can utilize an activity score value between zero and six. In particular, the dynamic modeling system 106 can utilize the activity score value of zero to six to indicate varying risk levels corresponding to the user account (e.g., via a risk score from the activity score decision tree). For instance, an activity score of zero can be associated with a high risk level (e.g., a high risk percentage) and an activity score of six can be associated with a low risk level (or vice versa). Indeed, the activity score can indicate a risk level of a user account failing to repay a utilized credit value.

In some embodiments, the activity score can be various numerical values and/or other types of data to indicate a category (or magnitude) of risk of a user account. For example, the activity score can include an alphabetical grade, a percentage, class, and/or a label. In addition, although one or more embodiments describe the dynamic modeling system 106 generating an activity score from a risk value determined within a decision tree of the activity machine learning model, the dynamic modeling system 106 can utilize the decision tree of the activity machine learning model to generate various metrics. For instance, the dynamic modeling system 106 can utilize the activity machine learning model to generate metrics such as, but not limited to, an interest (or satisfaction) value of a user account, a conversion probability for the user account, and/or a loyalty of the user account.

Although one or more embodiments describe the dynamic modeling system 106 utilizing an activity score decision tree model, the dynamic modeling system 106 can utilize various machine learning models to generate (or predict) an activity score for a user account. For example, the dynamic modeling system 106 can utilize a classification neural network to classify a user account into an activity score (or activity score grouping) based on one or more user activity data variables. In some instances, the dynamic modeling system 106 can utilize a regression-based and/or clustering-based machine learning models to determine an activity score for a user account based on one or more user activity data variables.

Furthermore, as shown in FIG. 3, the dynamic modeling system 106 selects an activity machine learning model for a user account (in the step 308) based on characteristics of the user account. For example, FIG. 3 illustrates the dynamic modeling system 106 selecting between activity machine learning models using an activity duration (e.g., a time or duration that the user account has been active). For example, the dynamic modeling system 106 can train different machine learning models based on different features available based on different durations for user accounts. The dynamic modeling system 106 can select the machine learning model pertinent to the particular user account at issue. Accordingly, FIG. 3 illustrates the dynamic modeling system 106 utilizing a user activity duration to select an activity machine learning model from between multiple activity machine learning models.

Additionally, in one or more embodiments, the dynamic modeling system 106 can train one or more activity machine learning models. In some embodiments, the dynamic modeling system 106 trains each activity machine learning model from the multiple activity machine learning models (as shown in FIG. 3) for a specific set of user accounts (e.g., based on the categorization with the user account data or characteristics such as user activity duration). As an example, the dynamic modeling system 106 trains an activity machine learning model to generate an accuracy score for a user account that corresponds to a user activity duration associated with the activity machine learning model. Indeed, the dynamic modeling system 106 can select, train, and utilize one or more activity machine learning models to generate an activity score as described in U.S. application Ser. No. 17/519,129.

Figure 4:
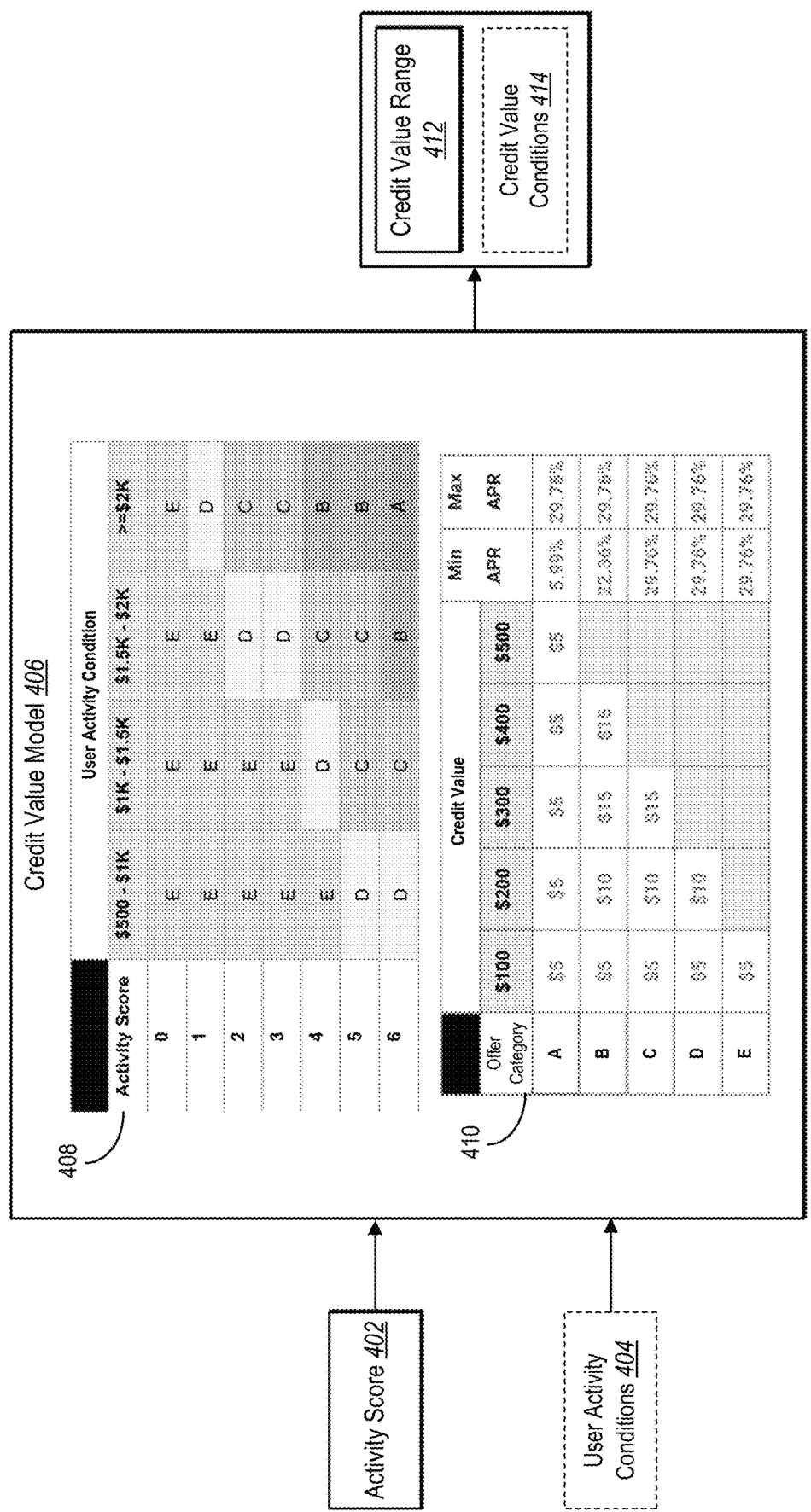
FIG. 4 illustrates a dynamic modeling system utilizing a credit value model to determine a credit value range in accordance with one or more implementations.

As mentioned above, the dynamic modeling system 106 can determine dynamic credit values and dynamic credit value conditions for user accounts utilizing a credit value model. For instance, FIG. 4 illustrates the dynamic modeling system 106 utilizing a credit value model to determine a credit value range (and one or more credit value conditions) for a user account. Indeed, FIG. 4 illustrates the dynamic modeling system 106 utilizing a credit value model that includes an offer category matrix and a credit value matrix with user activity scores and user activity conditions to determine the credit value range (and one or more credit value conditions) for the user account.

As shown in FIG. 4, the dynamic modeling system 106 utilizes a credit value model 406 that includes an offer category matrix 408 and a credit value matrix 410. Indeed, as illustrated in FIG. 4, the dynamic modeling system 106 utilizes an activity score 402 (and user activity conditions 404) to determine a credit value range 412 (and credit value conditions 414) from the credit value model 406. To determine the credit value range 412 (and credit value conditions 414), the dynamic modeling system 106 (in reference to FIG. 4) can determine an offer category for a user account by using the activity score 402 and user activity condition 404 with the offer category matrix 408 and utilize the determined offer category to determine both a credit value range 412 and the credit value conditions 414 from the credit value matrix 410.

To illustrate, as shown in FIG. 4, the offer category matrix 408 (of the credit value model 406) maps activity scores and user activity conditions to one or more offer categories. Indeed, to determine a specific offer category for a user account, the dynamic modeling system 106 identifies an offer category element within the offer category matrix 408 that corresponds to a combination of the activity score 402 and the user activity conditions 404. For example, in reference to FIG. 4, for a user account that is associated with an activity score of 0 and a user activity condition of $500-$1 k, the dynamic modeling system 106 determines an offer category of "E" for the user account from the offer category matrix 408. As another example, in reference to FIG. 4, for a user account that is associated with an activity score of 6 and a user activity condition of greater than or equal to $2K, the dynamic modeling system 106 determines an offer category of "A" for the user account from the offer category matrix 408.

As mentioned above, an offer category can include a grouping that indicates a type or range of credit values accessible to a user account based on a risk level. For instance, the dynamic modeling system 106 can determine an offer category for a user account to categorize a wider range of available credit value options and credit value conditions from a determined risk level of the user account via an activity score. Indeed, in some cases, the dynamic modeling system 106 utilizes the activity score with the offer category to indicate a risk level of a user account. For example, an activity score of zero or an offer category of "E" can indicate a high risk user account whereas an activity score of six or an offer category of "A" can indicate a low risk user account. In one or more embodiments, the dynamic modeling system 106 can utilize various representations such as, but not limited to, numerical, alphabetical, alpha-numerical representations to represent an activity score and/or an offer category.

In some instances, the dynamic modeling system 106 utilizes an account deposit amount as the user activity condition within the offer category matrix 408. For example, the user activity condition can include a direct deposit transaction activity of a particular deposit amount (or range of deposit amounts). Furthermore, the dynamic modeling system 106 can determine from the user activity conditions 404 a deposit transaction activity of the user account (e.g., a deposit transaction activity of 500 dollars, 1000 dollars, 1900 dollars). Indeed, as shown in FIG. 4, an increase in account deposit amounts (as the user activity condition) within the offer category matrix 408, in some cases, increases (or improves) the offer category determined for the user account.

Although one or more embodiments describes a deposit transaction activity as the user activity condition, the dynamic modeling system 106 can utilize various user activity data for the user activity condition. For example, the user activity condition within an object category matrix can include a frequency of a deposit transaction, a user-to-user transaction activity, and/or a spending transaction activity. Indeed, the dynamic modeling system 106 can map such user activity data and activity score from a user account within an offer category matrix to determine an offer category for the user account based on various user activity data (and subsequently a credit value range using a credit value matrix).

As just mentioned, upon determining an offer category for a user account from the offer category matrix 408, the dynamic modeling system 106 can, in reference to FIG. 4, determine the credit value range 412 (and the credit value conditions 414) using the credit value matrix 410. As shown in FIG. 4, the credit value matrix 410 includes a mapping between offer categories and one or more dynamic credit values. In addition, as also shown in FIG. 4, the credit value matrix 410 also includes elements for credit value conditions that map to various combinations of offer categories and dynamic credit values.

In one or more embodiments, in reference to FIG. 4, the dynamic modeling system 106 utilizes the credit value matrix 410 with a determined offer category (for a user account) to determine a credit value range for the user account. Indeed, in some embodiments, the dynamic modeling system 106 identifies credit values that including intersecting elements of the credit value matrix 410 with a particular offer category to determine the credit value range. For instance, the dynamic modeling system 106 utilizes the minimum credit value and the maximum credit value that intersects with a particular offer category of a user account as the credit value range for the user account. In some cases, the dynamic modeling system 106 identifies one or more credit values in the credit value matrix 410 that include populated elements between the particular offer category and the one or more credit values as credit values for the credit value range that is accessible by the user account.

To illustrate in reference to FIG. 4, the dynamic modeling system 106 can determine an offer category of "B" for a user account utilizing the offer category matrix 408 (as described above). Then, the dynamic modeling system 106 can utilize the offer category "B" for the user account with the credit value matrix 410 to identify one or more credit values for which the offer category "B" includes populated elements. As shown in FIG. 4, the credit value matrix includes populated elements for the offer category "B" for the credit value amounts of $100, $200, $300, and $400. As such, in the above mentioned example, the dynamic modeling system 106 determines a credit value range of $100-$400 for the user account from the credit value matrix 410 when the offer category is determined to be "B."

As another example in reference to FIG. 4, the dynamic modeling system 106 can determine an offer category of "D" for a user account utilizing the offer category matrix 408. Subsequently, the dynamic modeling system 106 can utilize the offer category "D" for the user account with the credit value matrix 410 to identify $100 and $200 as the credit values that correspond to the populated elements in relation to the offer category "D." Accordingly, the dynamic modeling system 106 determines a credit value range of $100-$200 for the user account from the credit value matrix 410 when the offer category is determined to be "D." In some cases, the dynamic modeling system 106 determines a singular credit value as the credit value range (e.g., $100 or $0 to $100 for the object category "E" in the credit value matrix 410).

In addition, the dynamic modeling system 106 can utilize a determined offer category and a credit value to determine credit value conditions for the credit value from a credit value matrix. For example, as shown in FIG. 4, the credit value matrix 410 includes credit value conditions as matrix elements. The credit value condition elements within the credit value matrix 410 can indicate a cost or other condition for utilization of a particular credit value under a particular offer category. For example, the credit value condition elements can indicate a cost of a credit value in terms of an interest on the credit value, a fee for receiving the credit value, a time period to payback a credit value, and/or other costs to a user account obtaining a credit value.

In one or more embodiments, the credit value condition elements within a credit value matrix can include precalculated (or predetermined) credit value conditions for a combination of an offer category and a credit value within the credit value matrix. For example, the dynamic modeling system 106 can determine credit value conditions that correspond to a credit value in association with a particular offer category. Then, the dynamic modeling system 106 can populate the credit value matrix utilizing the determined credit value condition.

In some cases, as shown in FIG. 4, the dynamic modeling system 106 utilizes a credit value matrix that includes individual credit value conditions for each incremental credit value in each offer category of the credit value matrix. Then, the dynamic modeling system 106 utilizes a combination of one or more individual credit value condition elements (e.g., via aggregation) from the credit value matrix to determine a credit value condition for a particular combination of a credit value and an offer category.

For example, in reference to FIG. 4, the dynamic modeling system 106 can determine a credit value condition of $10 (e.g., an interest fee of $10) utilizing the credit value matrix 410 for an offer category "A" and a credit value of $200 (e.g., an aggregation of the credit value condition elements of $5 and $5 for the credit value condition elements under and proceeding the credit value of $200 for the object category "A"). As another example, in reference to FIG. 4, the dynamic modeling system 106 can determine a credit value condition of $30 utilizing the credit value matrix 410 for an offer category "B" and a credit value of $300 (e.g., an aggregation of the credit value condition elements of $5, $10 and $15 for the credit value condition elements under and proceeding the credit value of $300 for the object category "B"). Although one or more embodiments illustrate the dynamic modeling system 106 aggregating credit value condition elements through addition, the dynamic modeling system 106 can utilize various approaches to aggregate the credit value conditions such as, but not limited to, averages, multiplication, and/or subtraction.

Upon determining one or more credit value conditions for one or more credit values in a credit value range, the dynamic modeling system 106 provides the credit value range and the credit value conditions for display within a graphical user interface on a client device. Indeed, in reference to FIG. 4, the dynamic modeling system 106 can utilize the credit value model 406 to output a credit value range 412 and credit value conditions 414 for the credit value range 412 as described above. Then, the dynamic modeling system 106 can display the credit value range and also dynamically update the credit value conditions for different credit values in the credit value range as described below (e.g., in relation to FIGS. 6A-6D and 7A-7G).

Figure 5:
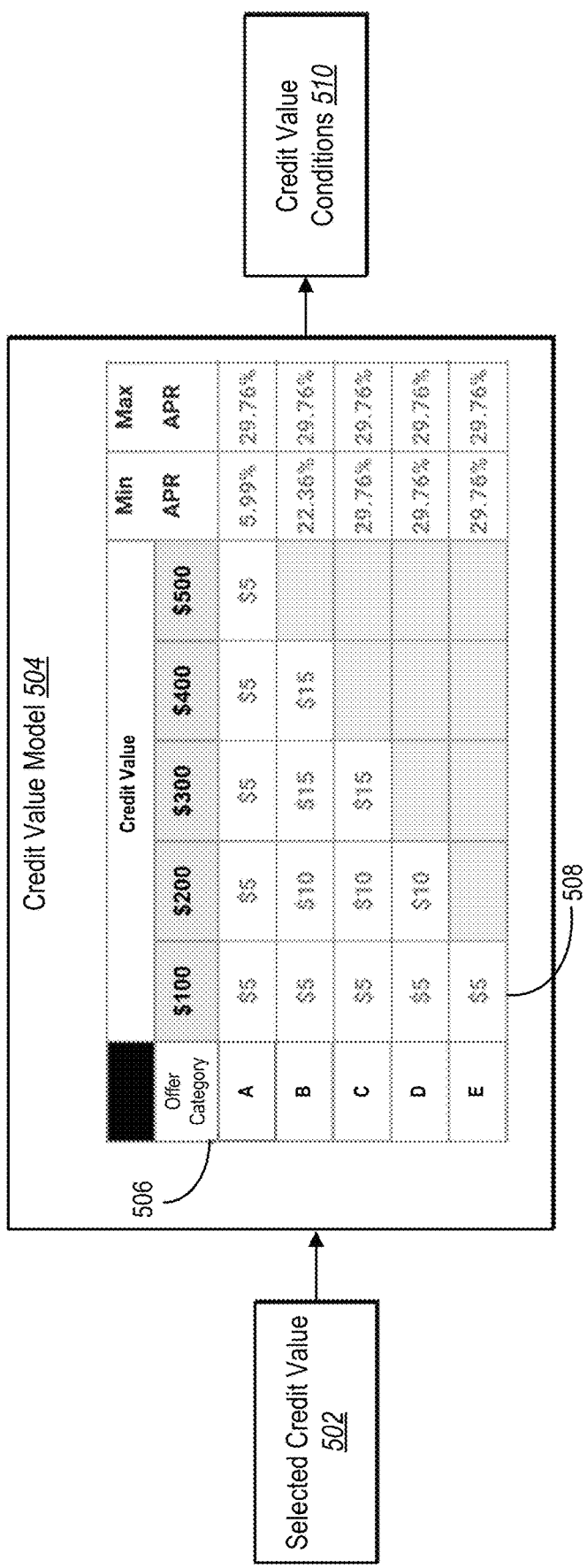
FIG. 5 illustrates a dynamic modeling system utilizing a credit value model to determine credit value conditions for a particular credit value in accordance with one or more implementations.

In some embodiments, the dynamic modeling system 106 utilizes the credit value model to determine a credit value condition upon receiving a selection of a credit value from a client device. Indeed, the dynamic modeling system 106 can determine the credit value conditions dynamically upon selection of a credit value on a client device. For example FIG. 5 illustrates the dynamic modeling system 106 utilizing a credit value model to determine credit value conditions for a particular credit value selected from a client device (e.g., within a GUI presenting a credit value range). As shown in FIG. 5, the dynamic modeling system 106 receives a selected credit value 502. Then, as shown in FIG. 5, the dynamic modeling system 106 utilizes the selected credit value 502 with a credit value matrix 506 of a credit value model 504 (and an offer category corresponding to a user account of the client device) to determine one or more credit value condition elements 508 to output as the credit value conditions 510 (as described above).

As mentioned above, in some cases, the dynamic modeling system 106 utilizes an aggregation of multiple credit value condition elements from the credit value condition elements 508 for a particular credit value. To illustrate, in one or more embodiments, the dynamic modeling system 106 receives a selection of a credit value of $400 from a client device corresponding to a user account that is determined to be in an offer category "A." The dynamic modeling system 106 can utilize the credit value of $400 and the offer category "A" within the credit value matrix 506 to identify the credit value condition elements $5, $5, $5, and $5 (e.g., from the credit value condition elements under and proceeding the credit value of $400 for the object category "A"). Then, the dynamic modeling system 106 can aggregate the identified credit value conditions (e.g., $20 via addition of $5, $5, $5, and $5) and utilize the aggregated credit value condition as the credit value condition for the credit value of $400 for the particular client device.

In certain instances, the dynamic modeling system 106 predetermines credit value conditions for various combinations of the offer categories and credit values. Moreover, the dynamic modeling system 106 can populate the predetermined credit value condition elements within a credit value matrix (as described above). Then, upon receiving a selection of a credit value, the dynamic modeling system 106 references the appropriate credit value and offer category corresponding to the user account to determine a credit value condition from the credit value matrix of a credit value model for the selected credit value.

Although one or more illustrations of an offer category matrix and a credit value matrix demonstrate specific credit values, offer categories, activity scores, and/or other information, the dynamic modeling system 106 can utilize an offer category matrix and a credit value matrix that includes various amounts of information. For example, the dynamic modeling system 106 can utilize an offer category matrix and a credit value matrix that includes various numbers of offer categories. In addition, the dynamic modeling system 106 can utilize an offer category matrix and a credit value matrix (or an activity machine learning model) that includes (or determines) various types of activity scores. Indeed, the dynamic modeling system 106 can utilize an offer category matrix and a credit value matrix that includes various numbers of user activity conditions, credit values, and activity condition elements in the matrices.

Additionally, although one or more embodiments illustrate the dynamic modeling system 106 utilizing a credit value model based on risk levels of user accounts (through the activity scores), the dynamic modeling system 106 can utilize various metrics from various types of activity scores to categorize and/or select offer categories and/or credit values from the credit value model. As an example, the dynamic modeling system 106 can utilize metrics such as, but not limited to, an interest (or satisfaction) value of a user account, a conversion probability for the user account, and/or a loyalty of the user account to categorize (and/or configure) credit value models (e.g., via credit value matrices or offer category matrices). Moreover, the dynamic modeling system 106 can utilize an activity score that corresponds to the various metrics to determine credit values and/or credit value conditions from the one or more credit value models in accordance with one or more embodiments herein.

In one or more embodiments, the values associated with a credit value model (e.g., the credit value matrix and/or the offer category matrix) can be generated (or populated) utilizing a machine learning model. As an example, the dynamic modeling system 106 can train a machine learning model (e.g., a decision tree model, a neural network, a regression model, a classification model) to determine (or predict) credit values and/or credit value conditions for varying activity scores and/or user activity conditions (e.g., mappings that are likely to result in a non-default success rate for the credit value that satisfies a threshold non-default success rate from user accounts that utilize credit values). Then, the dynamic modeling system 106 can utilize the machine learning model to generate a credit value model by populating data values of the credit value matrices and/or offer category matrices based on the determined credit values and predicted mappings to user activity conditions and/or activity scores.

In some instances, the values corresponding to the credit value model can be configured and/or modified by an administrator user on an administrator device. For example, the dynamic modeling system 106 can receive a selection or input values for a particular value or element within the credit value model. Then, the dynamic modeling system 106 can utilize the selection and/or input to modify credit values, activity scores, offer category associations, and/or user activity conditions within the credit value model. To illustrate, in some cases, the dynamic modeling system 106 can receive a user interaction from an administrator device to modify (e.g., increase or decrease) the credit values included within the credit value model.

Although one or more embodiments describe the dynamic modeling system 106 utilizing a credit value model and activity score (from the activity machine learning model) to determine credit values and/or credit value conditions, the dynamic modeling system 106 can utilize the credit value model and activity score to determine various types of other values for a user account. For example, the dynamic modeling system 106 can determine a base limit value for a user account in accordance with one or more embodiments herein. In some embodiments, the dynamic modeling system 106 can determine a credit line for a user account in accordance with one or more embodiments. Furthermore, the dynamic modeling system 106 can also determine a transfer limit (or ATM withdrawal limit) for a user account in accordance with one or more embodiments herein.

In some embodiments, the dynamic modeling system 106 identifies historical utilization of credit values from a user account and, in response, modifies a credit value model for a user account. As an example, upon a subsequent or multiple credit value utilization (e.g., a renewal of a credit value), the dynamic modeling system 106 modifies values within a credit value matrix and/or offer category matrix to modify the available credit value range and/or credit value conditions (e.g., credit value payoff durational terms or credit value interest fees) based on the renewal of a credit value by a user account. For instance, in one or more embodiments, the dynamic modeling system 106 increases the credit value range available to a user account in response to a renewal of a credit value (with a successful payback of the credit value) by the user account.

Figure 6B:
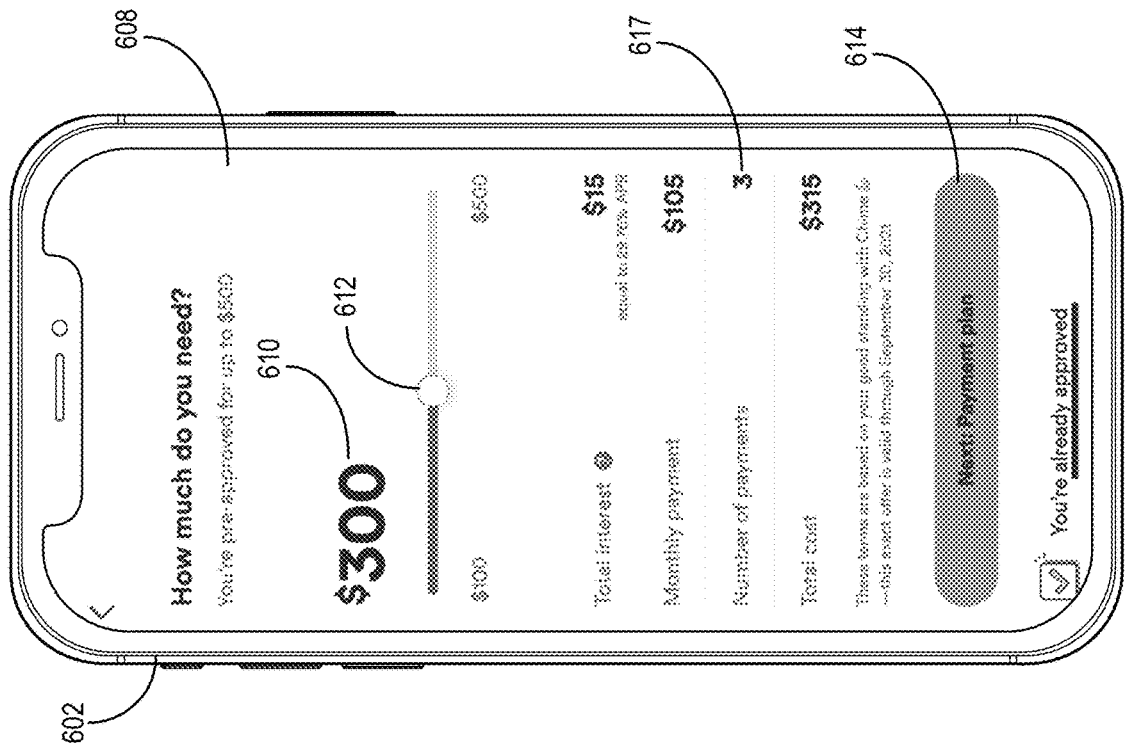
FIGS. 6A-6D illustrate graphical user interfaces for presenting credit values and credit value conditions in accordance with one or more implementations.
Figure 6A:
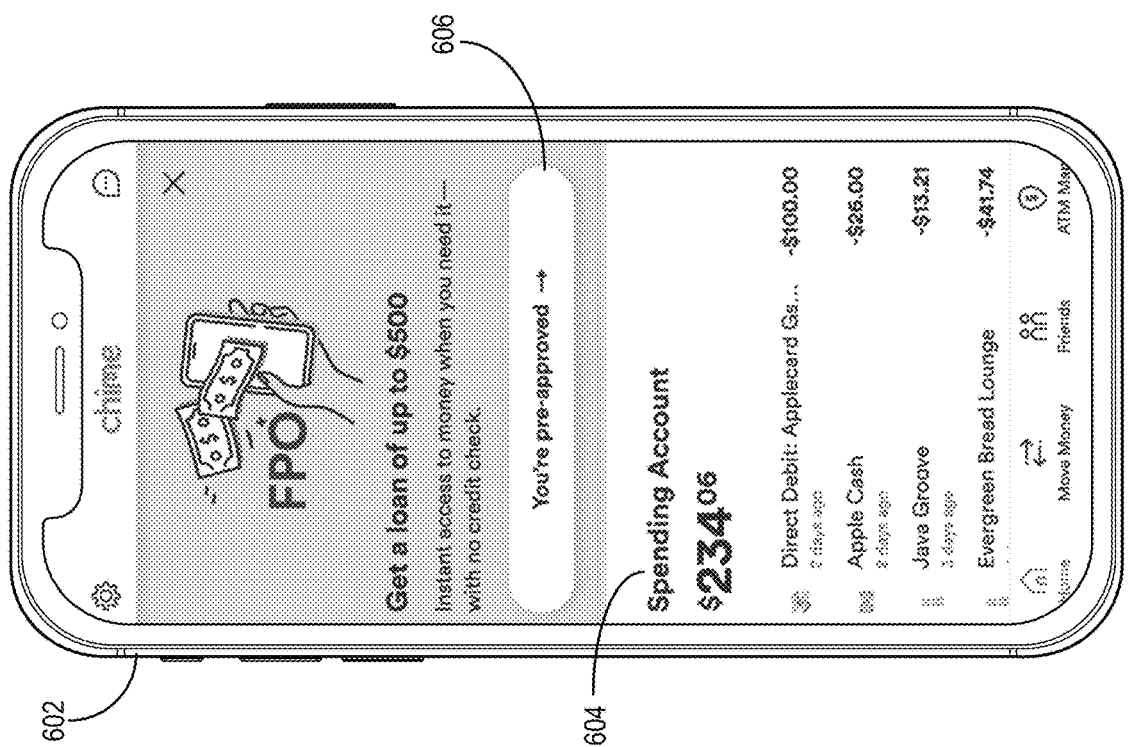

As previously mentioned, the dynamic modeling system 106 can generate user interface elements that dynamically present account-specific credit values and dynamic credit value conditions. For instance, FIGS. 6A-6D illustrate the dynamic modeling system 106 generating interface elements that dynamically present account-specific credit values and dynamic credit value conditions that are determined utilizing a machine learning model and a dynamic credit value model. Indeed, as shown in FIG. 6A, the dynamic modeling system 106 can provide, for display within a GUI 604 of a client device 602, account information for a user account. In addition, the dynamic modeling system 106 can provide, for display within the GUI 604, a selectable option 606 to obtain a credit value (e.g., a credit loan) that (as shown in the GUI 604) is determined using the credit value model (and without third-party sources).

Upon receiving a selection of the selectable option 606, the dynamic modeling system 106 can provide, for display within a GUI 608 of the client device 602, a credit value range determined in accordance with one or more embodiments herein. Indeed, as shown in FIG. 6B, the dynamic modeling system 106 can provide, for display within the GUI 608, selectable credit values 612 (e.g., a slider tool) to select a credit value 610 from a determined credit value range. As further shown in FIG. 6B, the dynamic modeling system 106 can provide, for display within the GUI 608, a selectable option 614 to confirm a selected credit value.

As further shown in FIG. 6B, upon receiving a selection of the credit value 610 from the selectable credit values 612, the dynamic modeling system 106 provides, for display within the GUI 608, dynamic credit value conditions 617 for the selected credit value 610 (in accordance with one or more embodiments). In some cases, upon changing the selected credit value 610 via the selectable credit values 612, the dynamic modeling system 106 can dynamically update credit value conditions (e.g., update the credit value conditions 617 displayed within the GUI 608). Indeed, in one or more embodiments, the dynamic modeling system 106 provides the pertinent information for the credit value transaction within a limited screen space utilizing the dynamic credit value and dynamic credit value condition in the reduced number of GUIS of FIGS. 6A and 6B.

Additionally, in one or more embodiments, the dynamic modeling system 106 displays a payment schedule for a credit value. For example, as shown in FIG. 6C, the dynamic modeling system 106 provides, for display within a GUI 616 of a client device 602, a payment schedule 620 that indicates scheduled payment times and the payment amounts (which include a credit value condition as an interest fee) for the credit value being obtained by the user account. Indeed, the dynamic modeling system 106 can include various amounts of information (or functionality) for a credit value determined from a credit value model within the limited screen space of mobile devices (including a selectable option to enable an autopay option). In some cases, the dynamic modeling system 106 can receive a selection of the edit option (or a previous screen option 618) from the client device 602 and facilitate the reselection of a credit value (e.g., using a GUI as described in FIG. 6B).

Figure 6D:
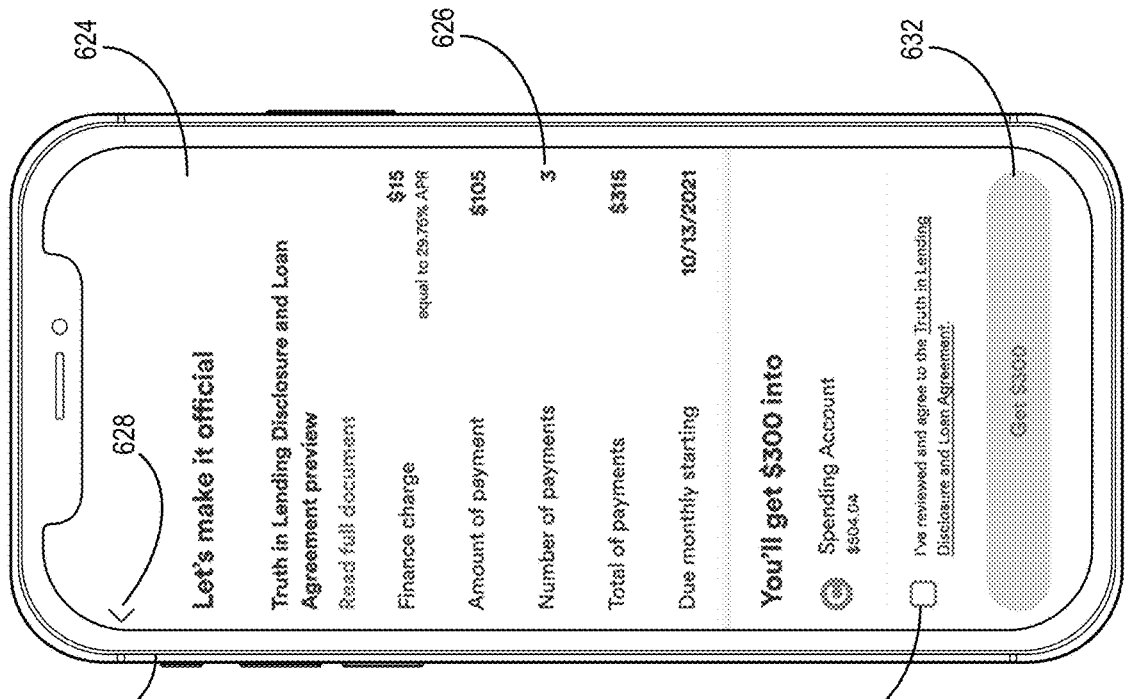
Figure 6C:
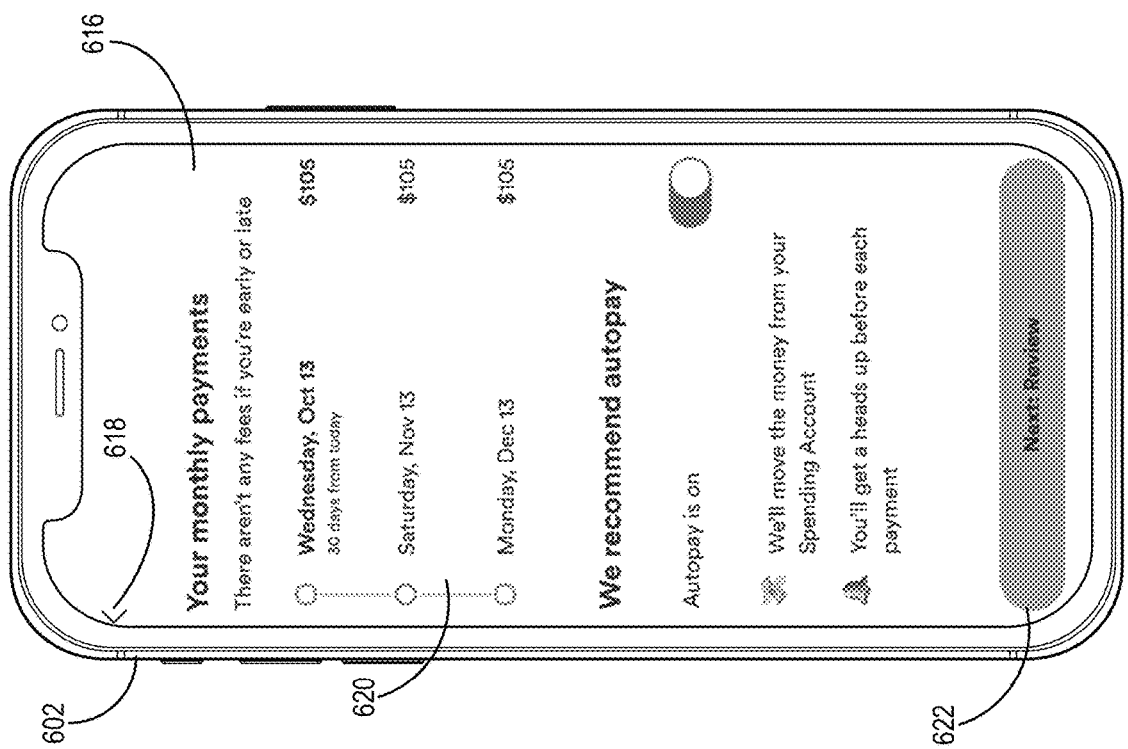

Moreover, as shown in FIG. 6D, upon receiving a selection of the selectable option 622 from the client device 602, the dynamic modeling system 106 provides, for display within a GUI 624 of the client device 602, dynamic credit value conditions 626 for the selected credit value (in accordance with one or more embodiments). As shown in FIG. 6D, the dynamic credit value conditions 626 indicate an interest fee associated with the credit value, a number of payments for the credit value, information for scheduled payments for the credit value. In some cases, the dynamic modeling system 106 can receive a selection of the edit option (or a previous screen option 628) from the client device 602 and facilitate the reselection of a credit value (e.g., using a GUI as described in FIG. 6B). As mentioned above, upon changing the selected credit value, the dynamic modeling system 106 can dynamically update credit value conditions (e.g., credit value conditions 626 displayed within the GUI 624 of FIG. 6D) in accordance with one or more embodiments. Indeed, in certain instances, the dynamic modeling system 106 provides the pertinent information for the credit value transaction within a limited screen space utilizing the dynamic credit value and dynamic credit value condition in the reduced number of GUIS of FIGS. 6A-6D. In some cases, the dynamic modeling system 106 provides the pertinent information for the credit value transaction within a limited screen space utilizing the dynamic credit value and dynamic credit value condition in the reduced number of GUIS of FIGS. 6A, 6B, and 6C (e.g., by not displaying the GUI as described in FIG. 6D).

As further shown in FIG. 6D, the dynamic modeling system 106 can also receive a selection of a selectable option 630 (e.g., a checkbox and/or radio button) that indicates agreement from a user of the user account for the credit value and the credit value conditions. Upon receiving a selection of the selectable option 630, the dynamic modeling system 106 provides, for display within the GUI 624, a selectable option 632. Indeed, upon receiving a selection of the selectable option 632, the dynamic modeling system 106 provides a credit value to the user account.

Figure 7B:
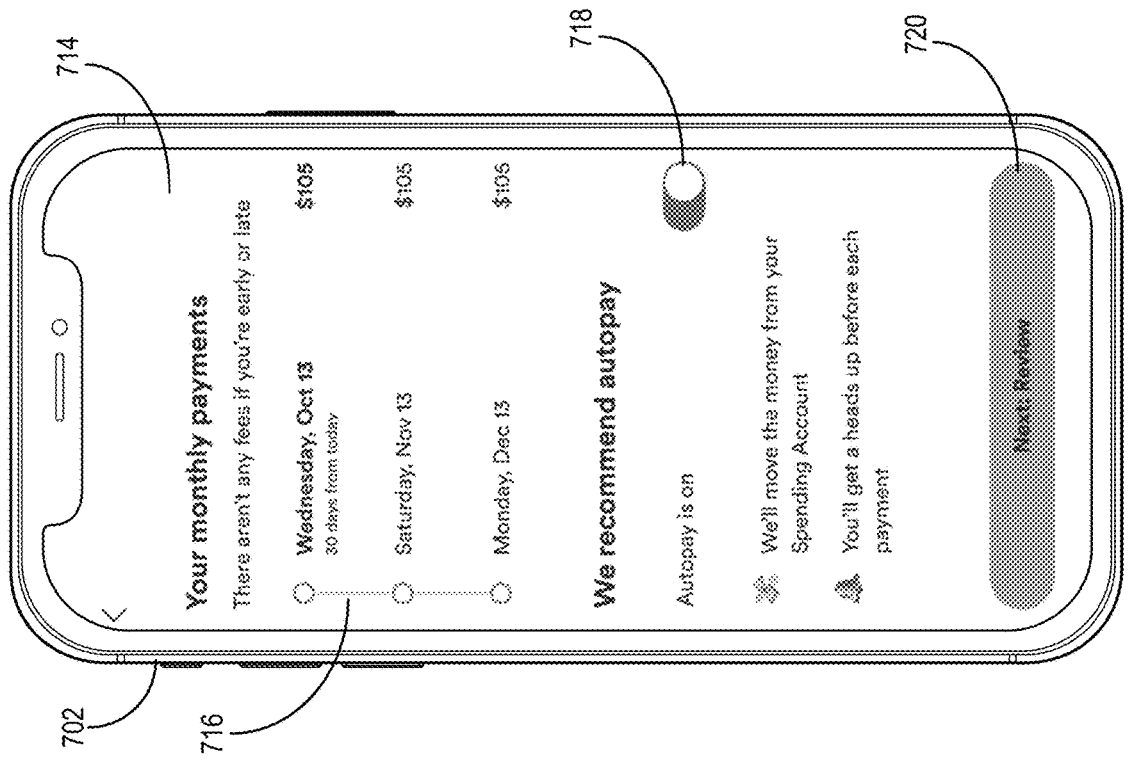
Figure 7A:
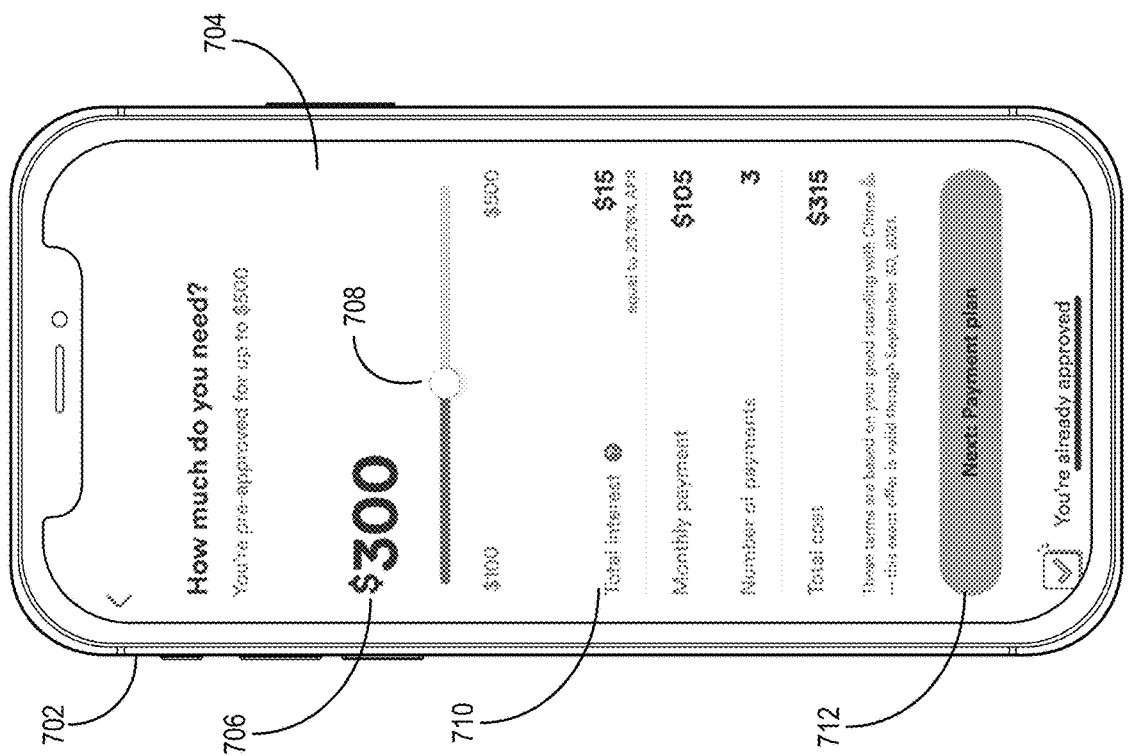

Additionally, FIGS. 7A-7G also illustrate the dynamic modeling system 106 generating interface elements that dynamically present account-specific credit values and dynamic credit value conditions that are determined utilizing a machine learning model and a dynamic credit value model. For instance, as shown in FIG. 7A, the dynamic modeling system 106 provides, for display within a GUI 704 of a client device 702, selectable credit values 708 for a credit value range determined from a credit value model. Indeed, upon selection of a credit value from the selectable credit values 708, the dynamic modeling system 106 can provide, for display within the GUI 704, a selected credit value 706 and also dynamic credit value conditions 710 for the selected credit value 706 from the credit value model (as described above).

In one or more embodiments, the dynamic modeling system 106 receives an updated selection of a credit value from the selectable credit values 708. Upon receiving the updated selection of the credit value, the dynamic modeling system 106 can determine dynamic credit value conditions and provide, for display within the GUI 704, updated credit value conditions that reflect the updated selection of the credit value. Indeed, as shown in FIG. 7A, the dynamic modeling system 106 can generate a singular GUI that displays a dynamic credit value range with selectable credit values and one or more dynamic credit value conditions (in real time) for a selected credit value received from the selectable credit values from the client device.

Furthermore, upon selection of the selectable option 712 in the GUI 704 (from FIG. 7A), the dynamic modeling system 106 can, as shown in FIG. 7B, provide, for display within a GUI 714 of the client device 702, a payment schedule 716 that indicates scheduled payment times and the payment amounts (which include a credit value condition as an interest fee) for the credit value being obtained by the user account. In addition, as shown in FIG. 7B, the dynamic modeling system 106 also provides, for display within the GUI 714, a selectable option 718 to trigger an auto pay option for the credit value (e.g., a scheduled payment that is automatically deducted from a user account to pay a credit value).

Figures 7C, 7D:
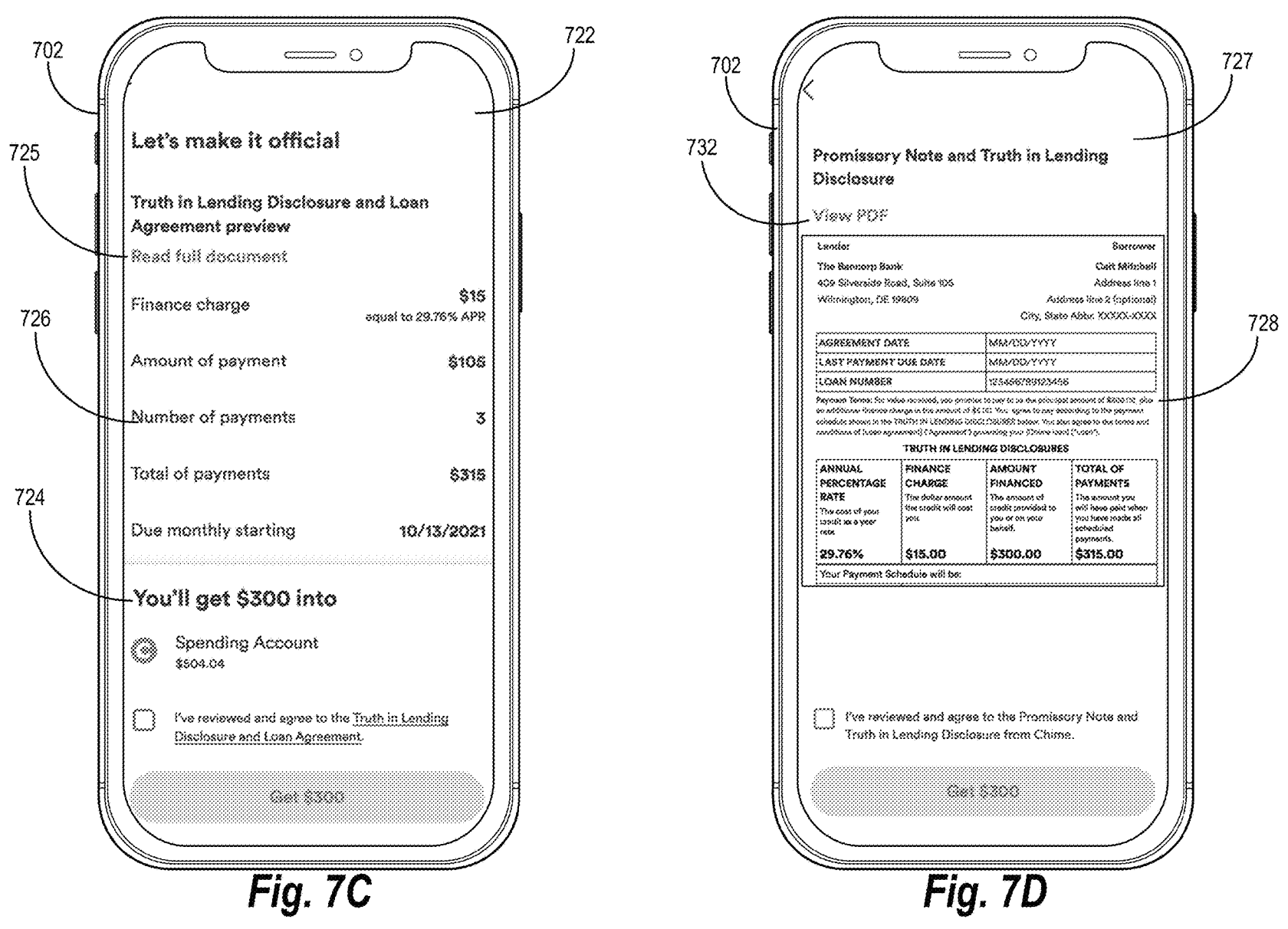

Additionally, as shown in FIG. 7C, the dynamic modeling system 106 can, upon receiving a selection of a selectable option 720 (from FIG. 7B), provide, for display within a GUI 722 of the client device 702, a selected credit value 724 and credit value conditions 726 for the credit value 724. In addition, as shown in FIG. 7D, the dynamic modeling system 106 can further provide, for display within the GUI 727 of the client device 702, electronic documents 728 (e.g., documents corresponding to the credit value such as a promissory note, lending disclosure, etc.). In some instances, the dynamic modeling system 106 provides, for display the GUI 727 with the electronic documents 728, upon selection a selectable option 725 (e.g., "Read full document") within the GUI 722 of FIG. 7C. In some embodiments, the dynamic modeling system 106 can display the electronic documents, the selected credit value, and the credit value conditions seamlessly within the same GUI utilizing scrolling.

Furthermore, as shown in FIG. 7D, the dynamic modeling system 106 provides, for display within the GUI 727, a selectable option 732 to view the electronic document in a document viewer (e.g., a PDF document, text document, spreadsheet document). For example, as shown in FIG. 7E, upon receiving a selection of the selectable option 732, the dynamic modeling system 106 provides, for display within a GUI 740 of the client device 702, an electronic document 736 that includes credit value conditions determined from the credit value model.

Figures 7E, 7F:
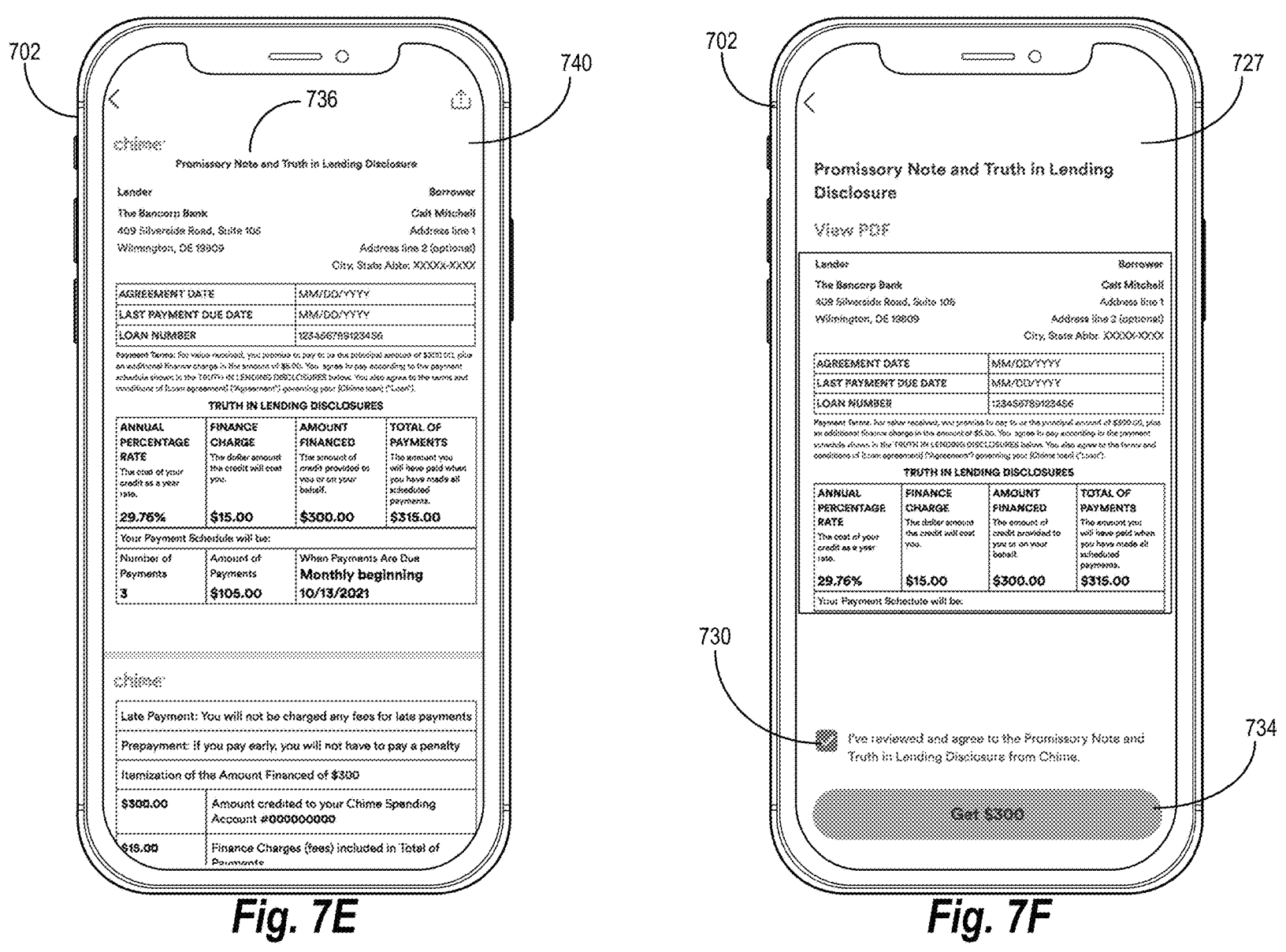
Figure 7G:
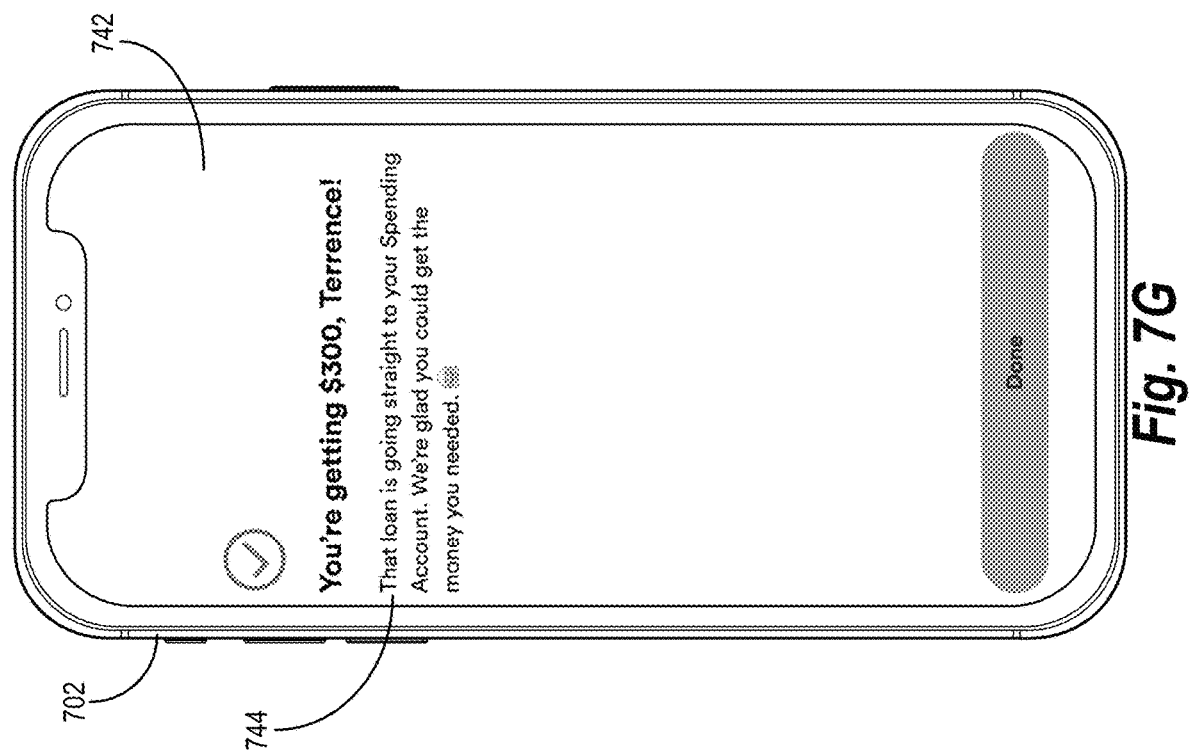

As shown in FIG. 7F, the dynamic modeling system 106 can also receive a selection of a selectable option 730 (e.g., a checkbox and/or radio button) that indicates agreement from a user of the user account for the credit value and the credit value conditions. Upon receiving a selection of the selectable option 730, the dynamic modeling system 106 provides, for display within the GUI 727, a selectable option 734. Indeed, upon receiving a selection of the selectable option 734, the dynamic modeling system 106 provides a credit value to the user account. Indeed, the dynamic modeling system 106, as shown in FIG. 7G, can provide, a confirmation message 744 within a GUI 742 of the client device 702. In one or more embodiments, the dynamic modeling system 106 can similarly receive a selection that indicates an agreement (e.g., via a checkbox and/or radio button) from a user and an acceptance selection (e.g., via a confirmation button) from within the GUI 722 of FIG. 7C and, in response, provide a credit value to the user account and/or a confirmation message.

Figure 8B:
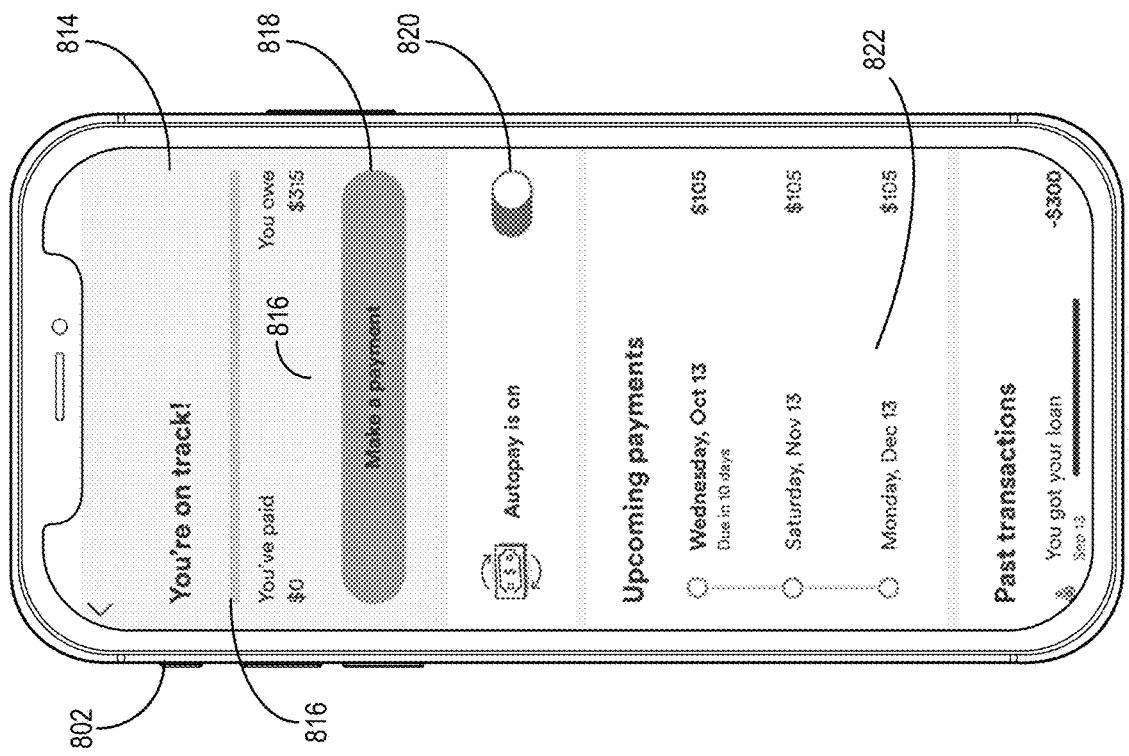
FIGS. 8A-8D illustrate graphical user interfaces for tracking a credit value in accordance with one or more implementations.
Figure 8A:
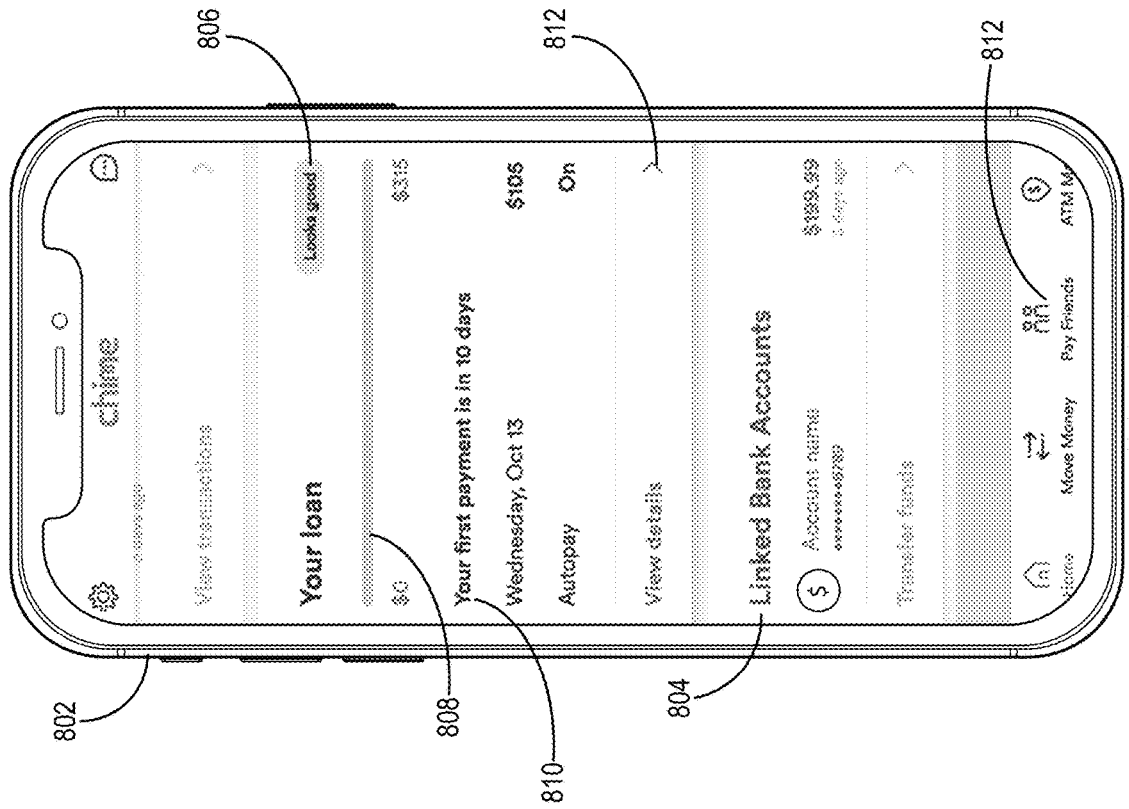
Figure 8D:
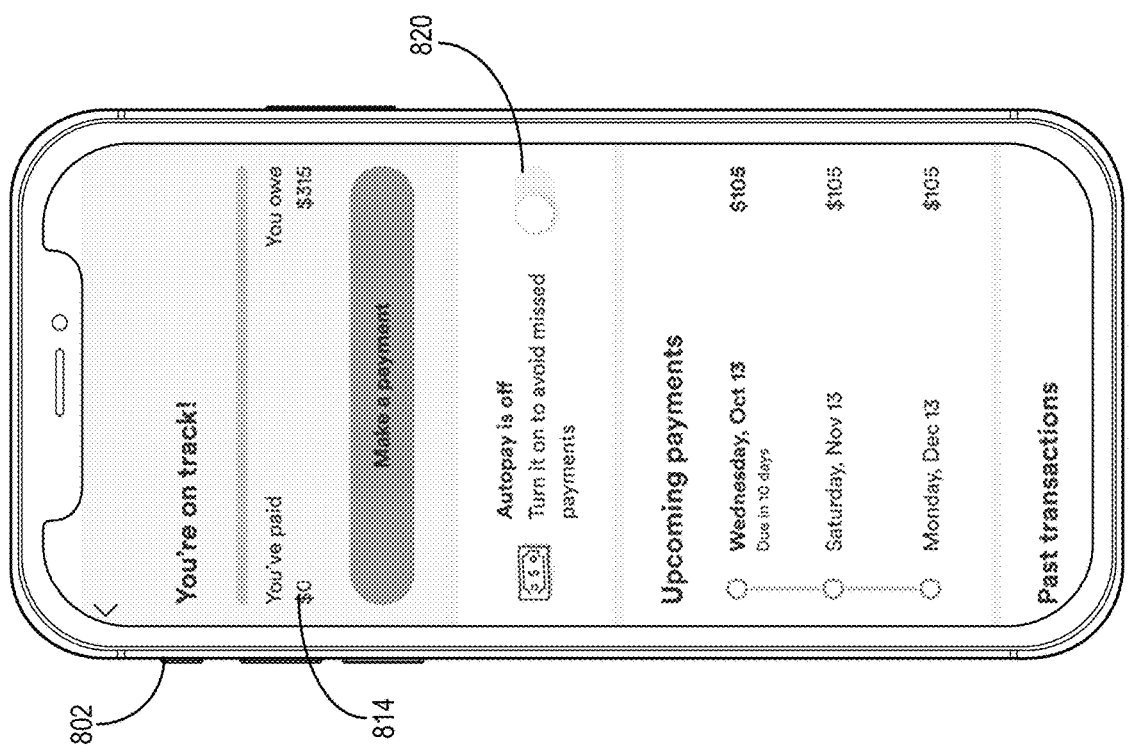

Furthermore, in one or more embodiments, the dynamic modeling system 106 generates one or more interface elements to track a credit value that is obtained by a user account. For example, FIGS. 8A-8D illustrate the dynamic modeling system 106 generating interface elements to track a credit value obtained by a user account (in accordance with one or more embodiments herein). For instance, as shown in FIG. 8A, the dynamic modeling system 106 provides, for display within a GUI 804 of a client device 802, a status indicator 806 for a credit value standing (e.g., whether payments for the credit value are on time or late). Furthermore, the dynamic modeling system 106 provides, for display within the GUI 804, a timeline interface 808 to track progress of payments for the credit value. Furthermore, the dynamic modeling system 106 also provides, for display within the GUI 804, interface elements 810 to indicate a next payment date for the credit value and whether an autopay setting is activated.

As also shown in FIG. 8A, the dynamic modeling system 106 provides, for display within the GUI 804, a selectable option 812 to access details for the obtained credit value. As shown by the transition from FIG. 8A to FIG. 8B, the dynamic modeling system 106 provides, for display within a GUI 814 of the client device 802, details for an obtained credit value (upon selection of the selectable option 812). For example, as shown in FIG. 8B, the dynamic modeling system 106 provides, for display within the GUI 814, a timeline interface 816 to track progress of payments for the credit value, a selectable option 818 to initiate a payment for the credit value, a selectable option 820 to toggle an autopay for the credit value, and a payment schedule 822 for the credit value. In some cases, the dynamic modeling system 106 can further provide, for display within the GUI 814, a selectable option to view a current (or active) credit value and a selectable option to view a historic credit value.

Figure 8C:
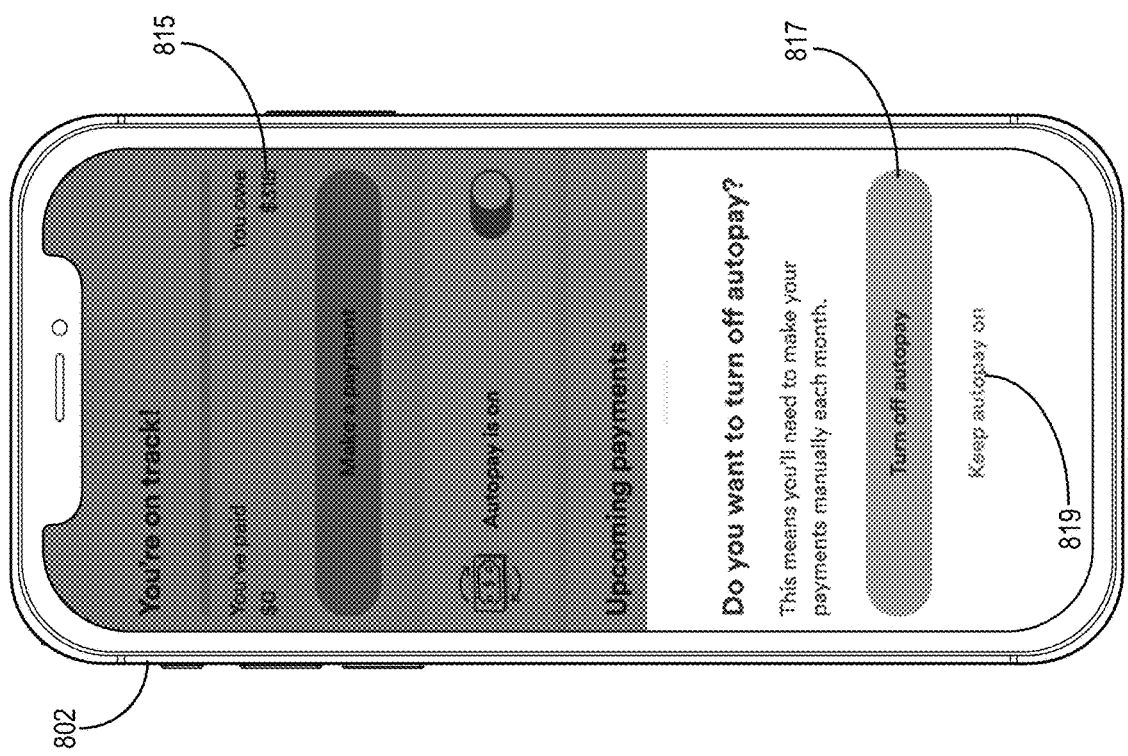

As further illustrated in FIG. 8C, upon receiving a selection of the selectable option 820 (from FIG. 8B), the dynamic modeling system 106 provides, for display within a GUI 815 of the client device 802, a confirmation for disabling an autopay feature for the credit value. In particular, as shown in FIG. 8C, the dynamic modeling system 106 provides, for display within the GUI 815, a selectable option 817 to disable autopay of the credit value and a selectable option 819 to maintain autopay. Upon selection of the selectable option 819, the dynamic modeling system 106 can continue to maintain auto pay for the user account. In some cases, as shown in the transition from FIG. 8C to FIG. 8D, the dynamic modeling system 106 provides, for display within the GUI 814 of the client device 802, the selectable option 820 in a state that indicates that the auto pay feature is disabled upon receiving a selection of the selectable option 817. In addition, the dynamic modeling system 106 also disables scheduled payments for the credit value and enables a manual payment option for the user account.

Additionally, in one or more embodiments, the dynamic modeling system 106 generates one or more interface elements to track a credit value that is obtained by a user account and is in a late payment status. For instance, FIGS. 9A and 9B illustrate the dynamic modeling system 106 generating interface elements to track a credit value obtained by a user account and in late payment. As shown in FIG. 9A, the dynamic modeling system 106 provides, for display within a GUI 904 of a client device 902, a status indicator 906 that indicates that a payment for the credit value is late. In addition, as shown in FIG. 9A, the dynamic modeling system 106 further provides, for display within the GUI 904, a selectable option 908 to initiate a payment for the credit value.

As also shown in FIG. 9A, the dynamic modeling system 106 provides, for display within the GUI 904, a selectable option 910 to access details for the obtained credit value. As shown by the transition from FIG. 9A to FIG. 9B, the dynamic modeling system 106 provides, for display within a GUI 912 of the client device 902, details for an obtained credit value (upon selection of the selectable option 910). For example, as shown in FIG. 9B, the dynamic modeling system 106 provides, for display within the GUI 912, a selectable option 918 to initiate a payment for the credit value. Additionally, as shown in FIG. 9B, the dynamic modeling system 106 also provides, for display within the GUI 912, a payment schedule 914 for the credit value that reflects the effect of the missed payment via the modified payment schedule information 916 (e.g., illustrating that a payment was missed and that a future payment will include the missed payment and a normal scheduled payment).

As further illustrated in FIG. 10A, upon receiving a selection of a selectable option to make a payment (e.g., the selectable option 918 from FIG. 9B), the dynamic modeling system 106 provides, for display within a GUI 1004 of a client device 1002, selectable options 1006, 1008, and 1010 to initiate a payment for a credit value. For example, as shown in FIG. 10A, the selectable option 1006 initiates a monthly scheduled payment for the credit value. As further shown in FIG. 10A, the selectable option 1008 initiates a full payment of the credit value.

In addition, as shown in FIG. 10A, the selectable option 1010 initiates a manual amount payment towards the credit value. To illustrate, as shown in the transition between FIG.

10A and FIG. 10B, the dynamic modeling system 106 provides, for display within a GUI 1012 of the client device 1002, a numerical keyboard 1018 to receive a manual payment amount towards the credit value, an input amount 1014, and a selectable user account payment source 1016 (upon selection of the selectable option 1010). Additionally, as shown in FIG. 10C, upon receiving input interactions via the numerical keyboard 1018, the dynamic modeling system 106 provides, for display within the GUI 1012 of the client device 1002, the input payment amount in the input amount 1014. In addition, as shown in FIG. 10, the dynamic modeling system 106 also provides, for display within the GUI 1012, a selectable option 1020 to complete the payment indicated in the input amount 1014.

Figure 10D:
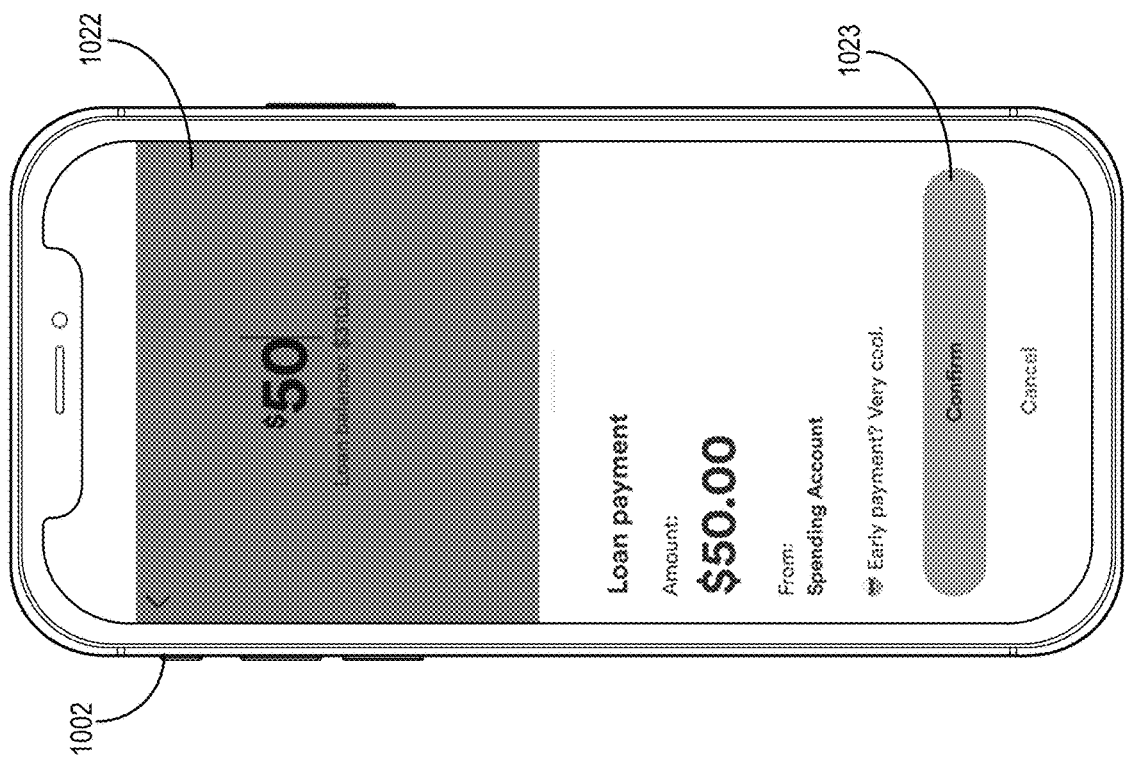
Figure 10C:
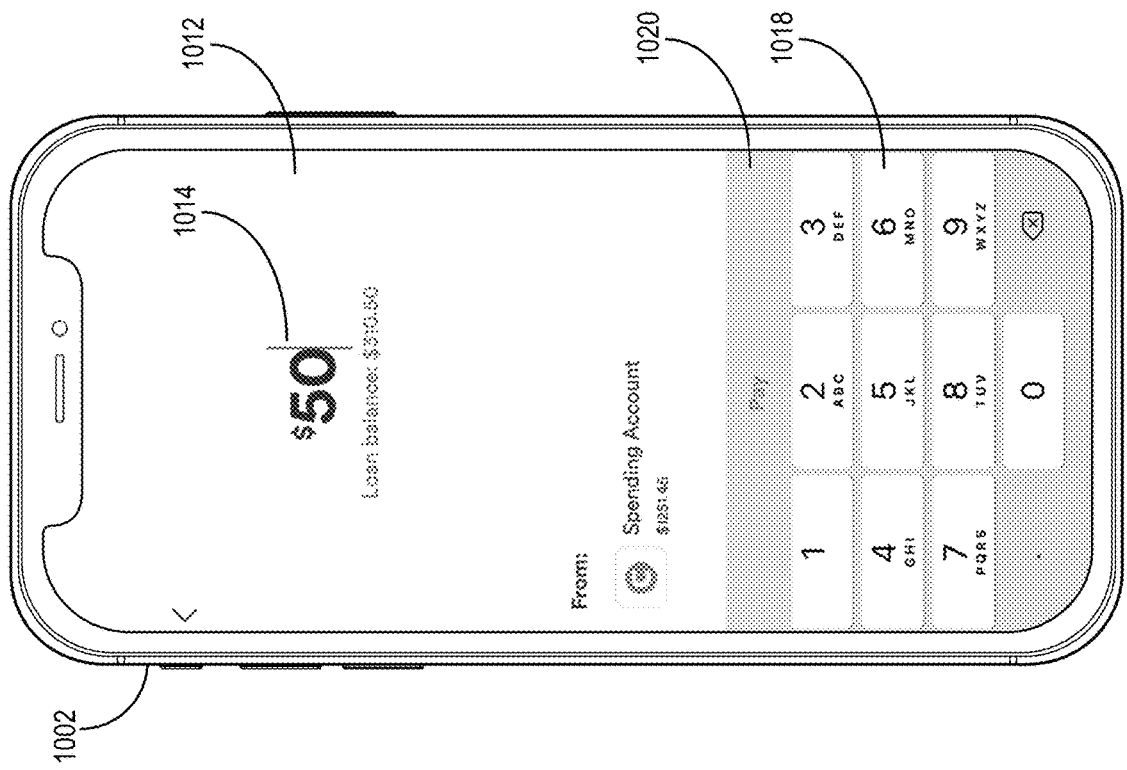

As shown in the transition from FIG. 10C to FIG. 10D, upon receiving a selection of the selectable option 1020, the dynamic modeling system 106 provides, for display within a GUI 1022 of the client device 1002, information for a credit value and a selectable option to finalize the payment indicated in the input amount 1014 (from GUI 1012 of FIG. 10C). Indeed, as shown in FIG. 10D, the dynamic modeling system 106 provides, for display within the GUI 1022, a selectable option 1023 to finalize the payment.

Figure 10E:
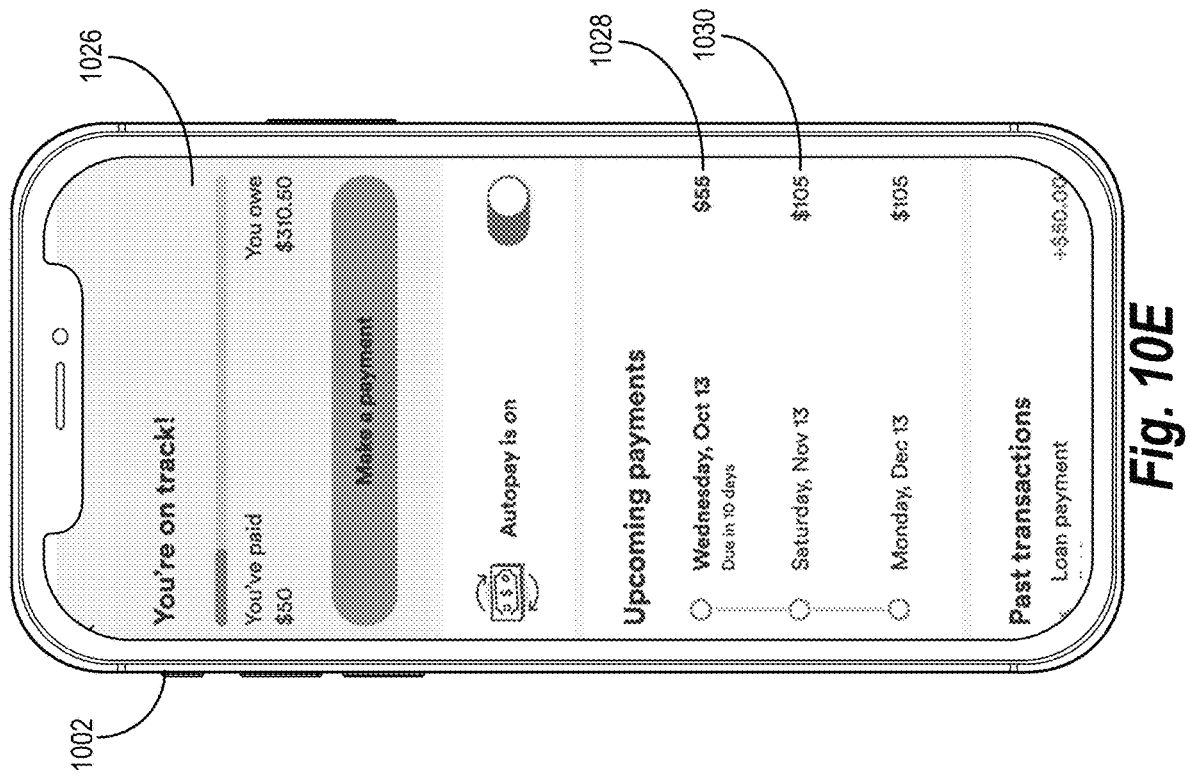

As shown in the transition from FIG. 10D to FIG. 10E, upon receiving a selection of the selectable option 1023, the dynamic modeling system 106 provides, for display within a GUI 1026 of the client device 1002, additional information for a credit value. As part of the GUI 1026, the dynamic modeling system 106 provides, for display, a payment schedule 1028 for the credit value that reflects the effect of the manual payment via the input amount 1014 (from FIG. 10C). In addition, as shown in FIG. 10E, the dynamic modeling system 106 also provides, for display within the GUI 1022, a subsequent payment schedule 1030 based on an original payment schedule of the user account for the credit value.

Additionally, in one or more embodiments, the dynamic modeling system 106 modifies a base limit value corresponding to a user account based on a transaction activity with credit values from the user account. Indeed, the dynamic modeling system 106 modifies a base limit value that is determined for a user account as described in U.S. application Ser. No. 17/519,129. For example, the dynamic modeling system 106 can decrease or terminate a base limit value available to a user account upon identifying one or more missed payments for a credit value of a user account. In addition, the dynamic modeling system 106 can also increase or enable a base limit value to a user account upon identifying that the user account includes one or more on-time payments for the credit value.

In some embodiments, the dynamic modeling system 106 determines modified credit value conditions based on varying scheduled payments for a credit value. In addition, the dynamic modeling system 106 can provide, for display within a GUI, user interface elements for selectable options for varying scheduled payments that present the modified credit value conditions. For example, FIGS. 11A and 11B illustrate the dynamic modeling system 106 displaying user interface elements for selectable options for varying scheduled payments that present the modified credit value conditions.

Figure 11A:
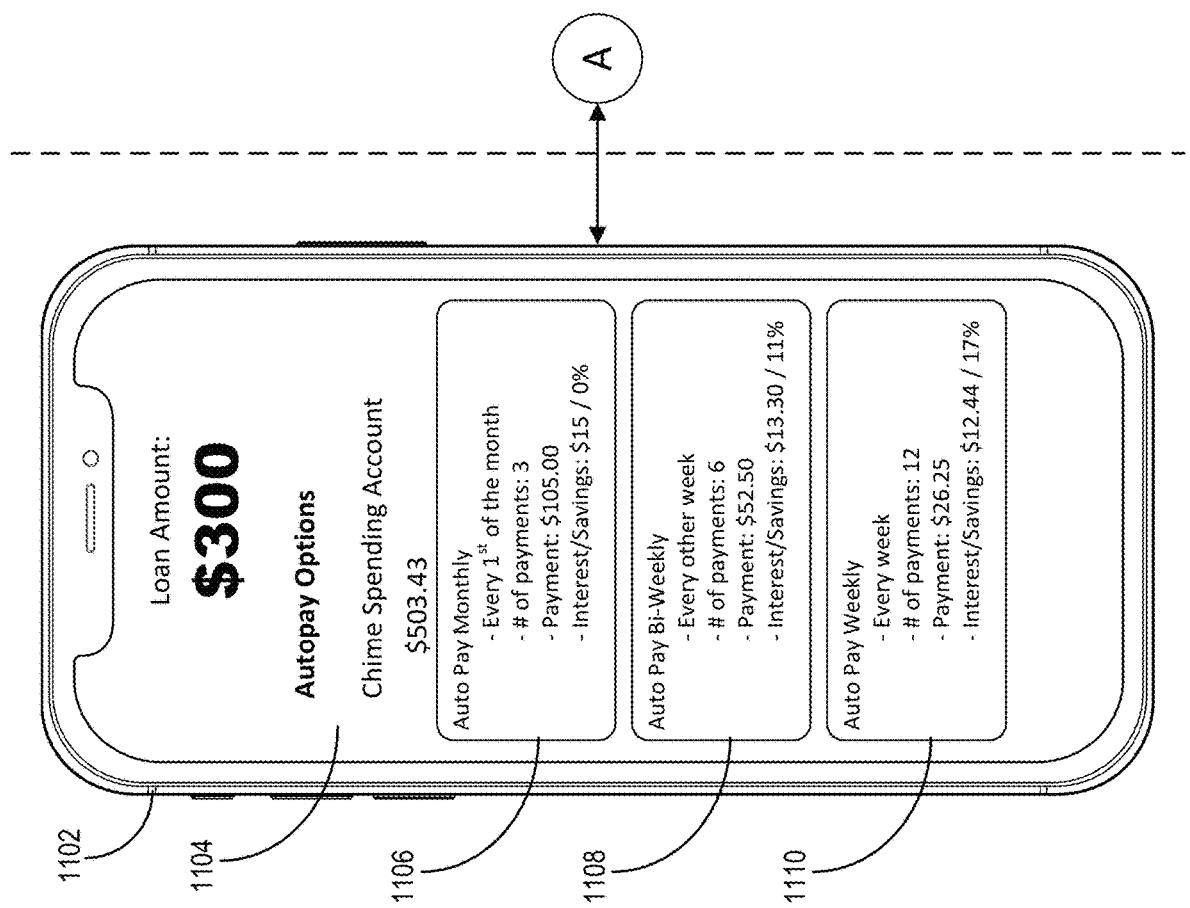
FIGS. 11A and 11B illustrate a graphical user interface for displaying selectable options for varying scheduled payments in accordance with one or more implementations.
Figure 11B:
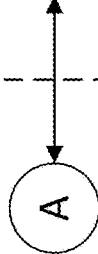

As shown in FIG. 11A, the dynamic modeling system 106 provides, for display within a GUI 1104 of a client device 1102, selectable options 1106, 1108, and 1110 for varying auto pay scheduled payment options for a credit value corresponding to a user account. Indeed, as shown in FIG. 11B, the dynamic modeling system 106 utilizes a scheduled payment model to determine changes to one or more credit value conditions based on a selected auto pay scheduled payment option. Indeed, the dynamic modeling system 106 can generate the scheduled payment model of FIG. 11B utilizing a mathematical model that determines changes to an interest fee and payment time for a credit value upon changing the payment frequency of the credit value.

For instance, as shown in FIG. 11A, the dynamic modeling system 106 utilizes the information corresponding to the monthly scheduled payment option (from FIG. 11B) to present that the selectable option 1106 results in 3 payments of $105 with no savings on interest for a credit value of $300. As further shown in FIG. 11A, the dynamic modeling system 106 utilizes the information corresponding to the bi-weekly scheduled payment option (from FIG. 11B) to present that the selectable option 1108 results in 6 payments of $52.50 with a savings on interest of 11% for a credit value of $300. Moreover, as also shown in FIG. 11, the dynamic modeling system 106 utilizes the information corresponding to the weekly scheduled payment option (from FIG. 11B) to present that the selectable option 1110 results in 12 payments of $26.25 with a 17% savings on interest for a credit value of $300.

Additionally, in some embodiments, the dynamic modeling system 106 determines a customized auto payment schedule for a credit value. In particular, in one or more embodiments, the dynamic modeling system 106 identifies a pattern (or schedule) of deposit transaction activity from a user account. Then, in one or more embodiments, the dynamic modeling system 106 provides, for display within a graphical user interface, selectable options to select the identified schedule or pattern of the deposit transaction activity as the customized auto payment schedule. For example, upon detecting that a user account receives a biweekly deposit transaction, the dynamic modeling system 106 can provides selectable options to schedule a payment of the credit value at a bi-weekly interval to match the biweekly deposit transaction.

In some cases, the dynamic modeling system 106 detects a type of deposit transaction to determine whether to utilize a portion of the deposit transaction to pay the credit value (e.g., a payroll deposit transaction versus a one-time transfer from another user account). Additionally, in some embodiments, the dynamic modeling system 106 utilizes a base value limit available to a user account to pay a credit value (e.g., upon a missed payment or due to an account value being lower than the scheduled payment for the credit value).

In some embodiments, the dynamic modeling system 106 (via the inter-network facilitation system 104) interfaces with a third-party service (e.g., a third party bank or vendor) to obtain a credit value for a user account. In particular, upon determining a credit value and credit value conditions for a user account (in accordance with one or more embodiments herein), the dynamic modeling system 106 can utilizes an application program interface (API) with a third-party service to request a credit value for the user account. Indeed, the dynamic modeling system 106 transmits a request via an API call that includes information for the credit value and credit value conditions. Then, in one or more embodiments, the dynamic modeling system 106 receives the credit value within the user account from the third-party service.

Although one or more embodiments illustrate the dynamic modeling system 106 displaying various user interface elements and a particular graphical user interface structure, the dynamic modeling system 106 can generate various user interface elements and/or structure to display information for the credit values and/or the credit value conditions. For example, the dynamic modeling system 106 can display a variety of user interface elements such as, but not limited to, sliding bars, progress charts, electronic calendars, and/or timelines. Moreover, the dynamic modeling system 106 can display the user interface elements to display information for the credit values and/or credit value conditions in various organizational orders.

As illustrated in the foregoing figures, the dynamic modeling system 106 can generate user interfaces that efficiently and flexibly provide account-specific credit values and credit value conditions. Indeed, the dynamic modeling system 106 can provide the foregoing interfaces without running a credit check or obtaining a third-party credit score (e.g., via a third party credit agency or bureau) or collecting a variety of background information from the member. Moreover, in one or more embodiments, the dynamic modeling system 106 does not apply any origination or late fees. Indeed, in some embodiments, the dynamic modeling system 106 does not apply additional interest or penalties, even when a user fails to pay prior to a payment deadline.

Figure 12:
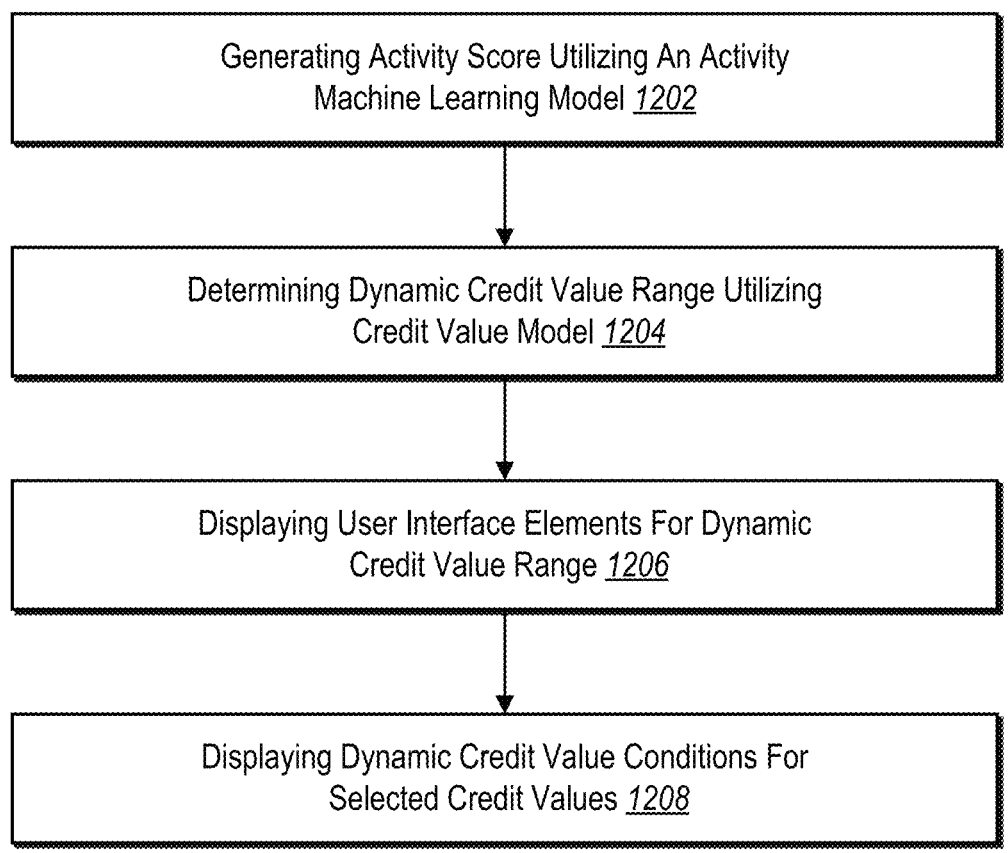
FIG. 12 illustrates a flowchart of a series of acts for utilizing a machine learning model and a dynamic credit value model to generate user interface elements that present credit values and credit value conditions in accordance with one or more implementations.

Turning now to FIG. 12, this figure shows a flowchart of a series of acts 1200 for utilizing a machine learning model and a dynamic credit value model to generate user interface elements that dynamically present credit values and dynamic credit value conditions in accordance with one or more implementations. While FIG. 12 illustrates acts according to one embodiment, alternative embodiments may omit, add to, reorder, and/or modify any of the acts shown in FIG. 12. The acts of FIG. 12 can be performed as part of a method. Alternatively, a non-transitory computer readable storage medium can comprise instructions that, when executed by the one or more processors, cause a computing device to perform the acts depicted in FIG. 12. In still further embodiments, a system can perform the acts of FIG. 12.

As shown in FIG. 12, the series of acts 1200 include an act 1202 of generating an activity score utilizing an activity machine learning model. In particular, the act 1202 can include generating an activity score utilizing an activity machine learning model from internal user activity data corresponding to a user account. Furthermore, the act 1202 can include generating an activity score utilizing at least one of historical application utilization, duration of satisfying a threshold credit account value, historical credit value utilization, credit value payoff times, historical flagged activities, historical transaction activity, or number of declined transactions, with the activity machine learning model. In some cases, the act 1202 can include generating an activity score utilizing an internal user activity data corresponding to a user account without requesting user data for a user of the user account from a third party network and without user input from the user. Additionally, the act 1202 can include selecting an activity machine learning model from a plurality of activity machine learning models utilizing a user activity duration corresponding to a user account.

As also shown in FIG. 12, the series of acts 1200 include an act 1204 of determining a dynamic credit value range utilizing a credit value model. In particular, the act 1204 can include determining a dynamic credit value range utilizing a credit value model with an activity score and a user activity condition corresponding to a user account. Furthermore, the act 1204 can include determining, from an offer category matrix, an offer category for a user account utilizing a combination of an activity score and a user activity condition corresponding to a user account. For example, an offer category matrix maps activity scores and user activity conditions to one or more offer categories.

Additionally, the act 1204 can include determining a dynamic credit value range utilizing an offer category with a credit value matrix. In addition, the act 1204 can include determining an offer category utilizing an offer category matrix by identifying an offer category within an offer category matrix that maps to an activity score and a user activity condition corresponding to the user account.

Moreover, the act 1204 can include determining a dynamic credit value range by identifying one or more dynamic credit values that correspond to a determined offer category within a credit value matrix. For instance, a credit value matrix includes a mapping between offer categories and dynamic credit values. Furthermore, the act 1204 can include determining a dynamic credit value range by identifying one or more dynamic credit values that correspond to a determined offer category within a credit value matrix and determining one or more dynamic credit value conditions by utilizing a selected credit value to identify one or more dynamic credit value condition elements from within the credit value matrix that correspond to the selected credit value and the determined offer category. In some cases, the act 1204 can include identifying a user activity condition by determining a deposit transaction activity of a user account or a frequency of a deposit transaction activity.

As shown in FIG. 12, the series of acts 1200 include an act 1206 of displaying user interface elements for a dynamic credit value range. In particular, the act 1206 can include providing for display, within a graphical user interface of a computing device corresponding to a user account, a user interface element that includes selectable credit values from a dynamic credit value range.

As shown in FIG. 12, the series of acts 1200 include an act 1208 of displaying dynamic credit value conditions for selected credit values. In particular, the act 1208 can include, upon receiving a selection of a credit value from the computing device, providing for display, within a graphical user interface, one or more dynamic credit value conditions for the credit value determined utilizing a credit value model. For instance, the act 1208 can include determining one or more dynamic credit value conditions by utilizing a selected credit value to determine one or more dynamic credit value condition elements from within a credit value matrix that correspond to the selected credit value and a determined offer category. In some embodiments, the act 1208 can include determining one or more dynamic credit value conditions by utilizing a selected credit value to determine an aggregation of credit value condition elements from within a credit value matrix that correspond to a selected credit value and a determined offer category. In addition, the act 1208 can include providing for display, within a graphical user interface, a selectable option to enable a scheduled transaction for the credit value that indicates a modified dynamic credit value condition.

In some embodiments, the act 1208 can include determining a scheduled transaction based on a user activity condition corresponding to a user account. For example, a user activity condition includes a deposit transaction activity of a user account or a timing of the deposit transaction activity. Furthermore, the act 1208 can include receiving a selection of an additional credit value from a computing device and, upon receiving the selection of the additional credit value from the computing device, providing for display, within a graphical user interface, one or more updated dynamic credit value conditions for the additional credit value determined utilizing a credit value model. Moreover, the act 1208 can include modifying a base limit value corresponding to a user account based on one or more transaction activities with a credit value from a user account.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, mini-computers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
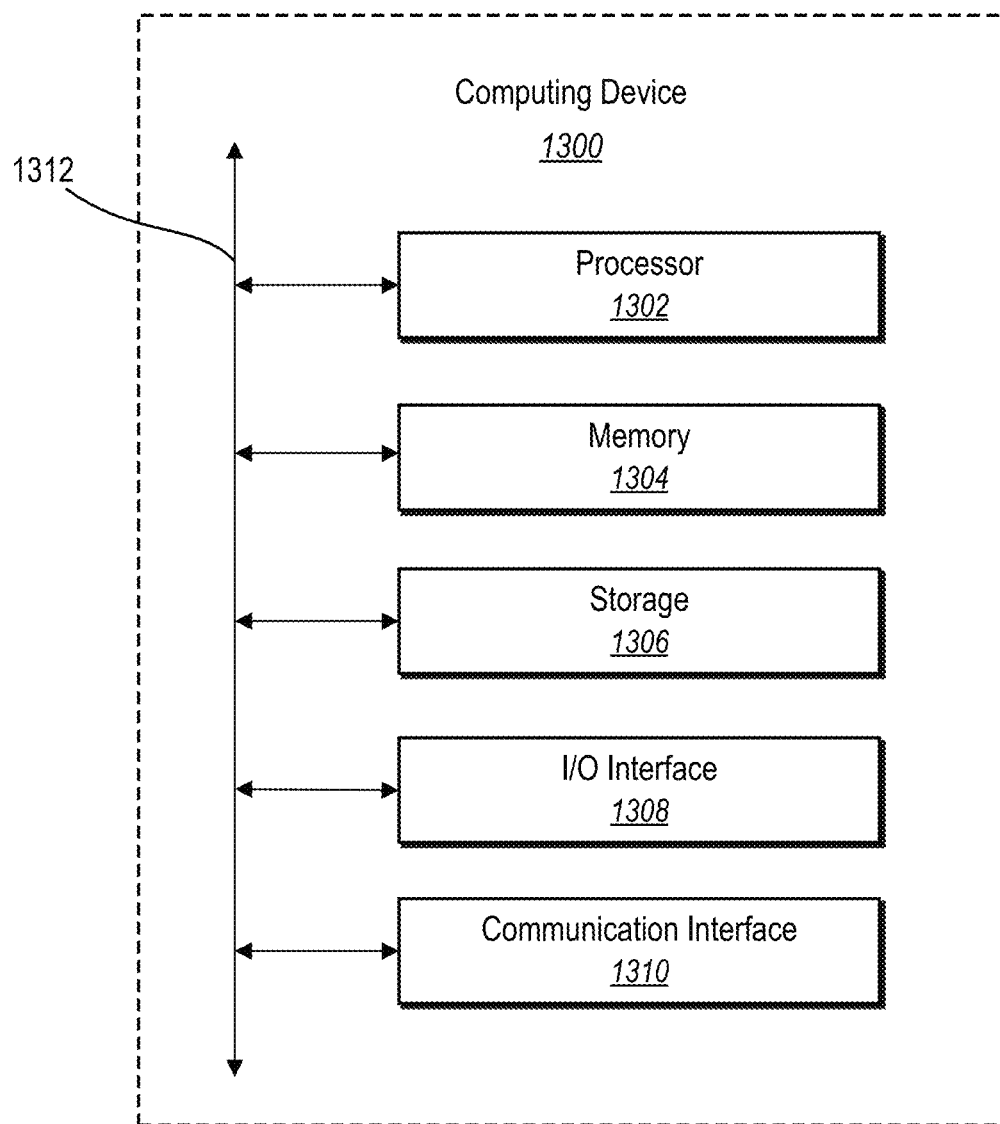
FIG. 13 illustrates a block diagram of an exemplary computing device in accordance with one or more implementations.

FIG. 13 illustrates, in block diagram form, an exemplary computing device 1300 that may be configured to perform one or more of the processes described above. One will appreciate that the dynamic modeling system 106 (or the inter-network facilitation system 104) can comprise implementations of a computing device, including, but not limited to, the devices or systems illustrated in the previous figures. As shown by FIG. 13, the computing device can comprise a processor 1302, memory 1304, a storage device 1306, an I/O interface 1308, and a communication interface 1310. In certain embodiments, the computing device 1300 can include fewer or more components than those shown in FIG. 13. Components of computing device 1300 shown in FIG. 13 will now be described in additional detail.

In particular embodiments, processor(s) 1302 includes hardware for executing instructions, such as those making up a computer program. As an example, and not by way of limitation, to execute instructions, processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, storage device 1306 can comprise a non-transitory storage medium described above. The storage device 1306 may include a hard disk drive ("HDD"), flash memory, a Universal Serial Bus ("USB") drive or a combination of these or other storage devices.

The computing device 1300 also includes one or more input or output ("I/O") interface 1308, which are provided to allow a user (e.g., requester or provider) to provide input to (such as user strokes), receive output from, and otherwise transfer data to and from the computing device 1300. These I/O interface 1308 may include a mouse, keypad or a keyboard, a touch screen, camera, optical scanner, network interface, modem, other known I/O devices or a combination of such I/O interface 1308. The touch screen may be activated with a stylus or a finger.

The I/O interface 1308 may include one or more devices for presenting output to a user, including, but not limited to, a graphics engine, a display (e.g., a display screen), one or more output providers (e.g., display providers), one or more audio speakers, and one or more audio providers. In certain embodiments, the I/O interface 1308 is configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 can provide one or more interfaces for communication (such as, for example, packet-based communication) between the computing device and one or more other computing devices 1300 or one or more networks. As an example, and not by way of limitation, communication interface 1310 may include a network interface controller ("NIC") or network adapter for communicating with an Ethernet or other wire-based network or a wireless NIC ("WNIC") or wireless adapter for communicating with a wireless network, such as a WI-FI. The computing device 1300 can further include a bus 1312. The bus 1312 can comprise hardware, software, or both that couples components of computing device 1300 to each other.

Figure 14:
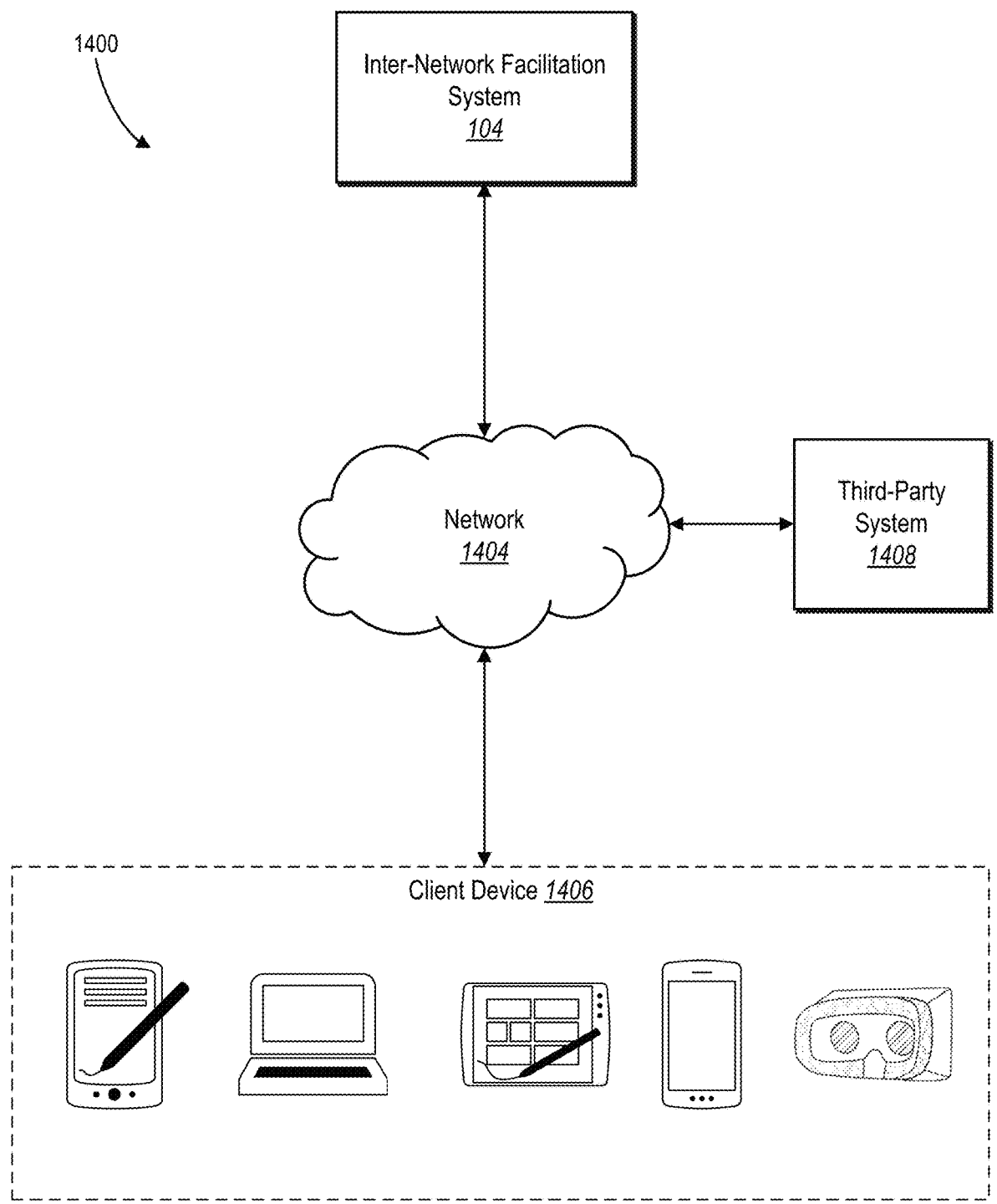
FIG. 14 illustrates an example environment for an internetwork facilitation system in accordance with one or more implementations.

FIG. 14 illustrates an example network environment 1400 of the inter-network facilitation system 104. The network environment 1400 includes a client device 1406 (e.g., client device 110), an inter-network facilitation system 104, and a third-party system 1408 connected to each other by a network 1404. Although FIG. 14 illustrates a particular arrangement of the client device 1406, the inter-network facilitation system 104, the third-party system 1408, and the network 1404, this disclosure contemplates any suitable arrangement of client device 1406, the inter-network facilitation system 104, the third-party system 1408, and the network 1404. As an example, and not by way of limitation, two or more of client device 1406, the inter-network facilitation system 104, and the third-party system 1408 communicate directly, bypassing network 1404. As another example, two or more of client device 1406, the inter-network facilitation system 104, and the third-party system 1408 may be physically or logically co-located with each other in whole or in part.

Moreover, although FIG. 14 illustrates a particular number of client devices 1406, inter-network facilitation systems 104, third-party systems 1408, and networks 1404, this disclosure contemplates any suitable number of client devices 1406, inter-network facilitation system 104, third-party systems 1408, and networks 1404. As an example, and not by way of limitation, network environment 1400 may include multiple client devices 1406, inter-network facilitation system 104, third-party systems 1408, and/or networks 1404.

This disclosure contemplates any suitable network 1404. As an example, and not by way of limitation, one or more portions of network 1404 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1404 may include one or more networks 1404.

Links may connect client device 1406, inter-network facilitation system 104 (e.g., which hosts the dynamic modeling system 106), and third-party system 1408 to network 1404 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1400. One or more first links may differ in one or more respects from one or more second links.

In particular embodiments, the client device 1406 may be an electronic device including hardware, software, or embedded logic components or a combination of two or more such components and capable of carrying out the appropriate functionalities implemented or supported by client device 1406. As an example, and not by way of limitation, a client device 1406 may include any of the computing devices discussed above in relation to FIG. 13. A client device 1406 may enable a network user at the client device 1406 to access network 1404. A client device 1406 may enable its user to communicate with other users at other client devices 1406.

In particular embodiments, the client device 1406 may include a requester application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 1406 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device 1406 one or more Hyper Text Markup Language ("HTML") files responsive to the HTTP request. The client device 1406 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, inter-network facilitation system 104 may be a network-addressable computing system that can interface between two or more computing networks or servers associated with different entities such as financial institutions (e.g., banks, credit processing systems, ATM systems, or others). In particular, the inter-network facilitation system 104 can send and receive network communications (e.g., via the network 1404) to link the third-party-system 1408. For example, the inter-network facilitation system 104 may receive authentication credentials from a user to link a third-party system 1408 such as an online bank account, credit account, debit account, or other financial account to a user account within the inter-network facilitation system 104. The inter-network facilitation system 104 can subsequently communicate with the third-party system 1408 to detect or identify balances, transactions, withdrawal, transfers, deposits, credits, debits, or other transaction types associated with the third-party system 1408. The inter-network facilitation system 104 can further provide the aforementioned or other financial information associated with the third-party system 1408 for display via the client device 1406. In some cases, the inter-network facilitation system 104 links more than one third-party system 1408, receiving account information for accounts associated with each respective third-party system 1408 and performing operations or transactions between the different systems via authorized network connections.

In particular embodiments, the inter-network facilitation system 104 may interface between an online banking system and a credit processing system via the network 1404. For example, the inter-network facilitation system 104 can provide access to a bank account of a third-party system 1408 and linked to a user account within the inter-network facilitation system 104. Indeed, the inter-network facilitation system 104 can facilitate access to, and transactions to and from, the bank account of the third-party system 1408 via a client application of the inter-network facilitation system 104 on the client device 1406. The inter-network facilitation system 104 can also communicate with a credit processing system, an ATM system, and/or other financial systems (e.g., via the network 1404) to authorize and process credit charges to a credit account, perform ATM transactions, perform transfers (or other transactions) across accounts of different third-party systems 1408, and to present corresponding information via the client device 1406.

In particular embodiments, the inter-network facilitation system 104 includes a model for approving or denying transactions. For example, the inter-network facilitation system 104 includes a transaction approval machine learning model that is trained based on training data such as user account information (e.g., name, age, location, and/or income), account information (e.g., current balance, average balance, maximum balance, and/or minimum balance), credit usage, and/or other transaction history. Based on one or more of these data (from the inter-network facilitation system 104 and/or one or more third-party systems 1408), the inter-network facilitation system 104 can utilize the transaction approval machine learning model to generate a prediction (e.g., a percentage likelihood) of approval or denial of a transaction (e.g., a withdrawal, a transfer, or a purchase) across one or more networked systems.

The inter-network facilitation system 104 may be accessed by the other components of network environment 1400 either directly or via network 1404. In particular embodiments, the inter-network facilitation system 104 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the inter-network facilitation system 104 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1406, or an inter-network facilitation system 104 to manage, retrieve, modify, add, or delete, the information stored in data store.

In particular embodiments, the inter-network facilitation system 104 may provide users with the ability to take actions on various types of items or objects, supported by the inter-network facilitation system 104. As an example, and not by way of limitation, the items and objects may include financial institution networks for banking, credit processing, or other transactions, to which users of the inter-network facilitation system 104 may belong, computer-based applications that a user may use, transactions, interactions that a user may perform, or other suitable items or objects. A user may interact with anything that is capable of being represented in the inter-network facilitation system 104 or by an external system of a third-party system, which is separate from inter-network facilitation system 104 and coupled to the inter-network facilitation system 104 via a network 1404.

In particular embodiments, the inter-network facilitation system 104 may be capable of linking a variety of entities. As an example, and not by way of limitation, the inter-network facilitation system 104 may enable users to interact with each other or other entities, or to allow users to interact with these entities through an application programming interfaces ("API") or other communication channels.

In particular embodiments, the inter-network facilitation system 104 may include a variety of servers, sub-systems, programs, modules, logs, and data stores. In particular embodiments, the inter-network facilitation system 104 may include one or more of the following: a web server, action logger, API-request server, transaction engine, cross-institution network interface manager, notification controller, action log, third-party-content-object-exposure log, inference module, authorization/privacy server, search module, user-interface module, user-profile (e.g., provider profile or requester profile) store, connection store, third-party content store, or location store. The inter-network facilitation system 104 may also include suitable components such as network interfaces, security mechanisms, load balancers, failover servers, management-and-network-operations consoles, other suitable components, or any suitable combination thereof. In particular embodiments, the inter-network facilitation system 104 may include one or more user-profile stores for storing user profiles for transportation providers and/or transportation requesters. A user profile may include, for example, biographic information, demographic information, financial information, behavioral information, social information, or other types of descriptive information, such as interests, affinities, or location.

The web server may include a mail server or other messaging functionality for receiving and routing messages between the inter-network facilitation system 104 and one or more client devices 1406. An action logger may be used to receive communications from a web server about a user's actions on or off the inter-network facilitation system 104. In conjunction with the action log, a third-party-content-object log may be maintained of user exposures to third-party-content objects. A notification controller may provide information regarding content objects to a client device 1406. Information may be pushed to a client device 1406 as notifications, or information may be pulled from client device 1406 responsive to a request received from client device 1406. Authorization servers may be used to enforce one or more privacy settings of the users of the inter-network facilitation system 104. A privacy setting of a user determines how particular information associated with a user can be shared. The authorization server may allow users to opt in to or opt out of having their actions logged by the inter-network facilitation system 104 or shared with other systems, such as, for example, by setting appropriate privacy settings. Third-party-content-object stores may be used to store content objects received from third parties. Location stores may be used for storing location information received from client devices 1406 associated with users.

In addition, the third-party system 1408 can include one or more computing devices, servers, or sub-networks associated with internet banks, central banks, commercial banks, retail banks, credit processors, credit issuers, ATM systems, credit unions, loan associates, brokerage firms, linked to the inter-network facilitation system 104 via the network 1404. A third-party system 1408 can communicate with the inter-network facilitation system 104 to provide financial information pertaining to balances, transactions, and other information, whereupon the inter-network facilitation system 104 can provide corresponding information for display via the client device 1406. In particular embodiments, a third-party system 1408 communicates with the inter-network facilitation system 104 to update account balances, transaction histories, credit usage, and other internal information of the inter-network facilitation system 104 and/or the third-party system 1408 based on user interaction with the inter-network facilitation system 104 (e.g., via the client device 1406). Indeed, the inter-network facilitation system 104 can synchronize information across one or more third-party systems 1408 to reflect accurate account information (e.g., balances, transactions, etc.) across one or more networked systems, including instances where a transaction (e.g., a transfer) from one third-party system 1408 affects another third-party system 1408.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   training an activity machine learning model by:
      inputting activity data that includes activity data variables of multiple user accounts into the activity machine learning model as training data, wherein the activity data comprises historical transaction activity or historical credit value utilization;
      receiving output of predicted activity scores from the activity machine learning model based on the input activity data;
      generating, utilizing a loss function, loss values for the activity machine learning model utilizing a comparison between the output of predicted activity scores and ground truth activity scores for the multiple user accounts from the training data; and
      adjusting weights of the activity data variables corresponding to the activity machine learning model based on the generated loss values to train the activity machine learning model to more effectively determine a risk of an account of the multiple user accounts, wherein the activity machine learning model comprises a neural network or a decision tree model;
   generating an activity score utilizing the trained activity machine learning model from internal user activity data corresponding to a user account;
   determining a dynamic credit value range utilizing a credit value model with the activity score generated from the trained activity machine learning model and a user activity condition corresponding to the user account by:
      determining, from an offer category matrix, an offer category for the user account utilizing a combination of the activity score and the user activity condition corresponding to the user account, wherein the offer category matrix maps activity scores and user activity conditions to one or more offer categories; and determining the dynamic credit value range by identifying one or more dynamic credit values that correspond to the determined offer category within a credit value matrix, wherein the credit value matrix comprises a mapping between offer categories and dynamic credit values;

providing for display, within a graphical user interface of a computing device corresponding to the user account, a user interface slider comprising selectable credit values from the dynamic credit value range; and upon receiving a selection of a credit value from the computing device, providing for display, within the graphical user interface, one or more dynamic credit value conditions for the credit value determined utilizing the credit value model.

2. The computer-implemented method of claim 1, further comprising generating the activity score utilizing the internal user activity data corresponding to the user account without requesting user data for a user of the user account from a third-party network.

3. The computer-implemented method of claim 1, further comprising:
receiving a selection of an additional credit value from the computing device; and
upon receiving the selection of the additional credit value from the computing device, provide for display, within the graphical user interface, one or more updated dynamic credit value conditions for the additional credit value determined utilizing the credit value model.

4. The computer-implemented method of claim 1, further comprising determining the one or more dynamic credit value conditions by utilizing the selected credit value to determine an aggregation of credit value condition elements from within the credit value matrix that correspond to the selected credit value and the determined offer category.

5. The computer-implemented method of claim 1, further comprising determining the offer category utilizing the offer category matrix by identifying an offer category within the offer category matrix that maps to the activity score and the user activity condition corresponding to the user account.

6. The computer-implemented method of claim 1, further comprising generating the activity score utilizing at least one of historical application utilization of the user account, duration of satisfying a threshold account value of the user account, historical credit value utilization of the user account, credit value payoff times of the user account, historical flagged activities of the user account, historical transaction activity of the user account, or number of declined transactions of the user account, with the trained activity machine learning model.

7. The computer-implemented method of claim 1, further comprising providing for display, within the graphical user interface, a selectable option to enable a scheduled transaction for the credit value that indicates a modified dynamic credit value condition.

8. The computer-implemented method of claim 7, further comprising determining the scheduled transaction based on the user activity condition corresponding to the user account, wherein the user activity condition comprises a deposit transaction activity of the user account or a timing of the deposit transaction activity.

9. The computer-implemented method of claim 1, further comprising selecting the trained activity machine learning model from a plurality of trained activity machine learning models utilizing a user activity duration corresponding to a user account.

10. A non-transitory computer-readable medium storing instructions that, when executed by at least one processor, cause a computing device to:
train an activity machine learning model by:
inputting activity data that includes activity data variables of multiple user accounts into the activity machine learning model as training data, wherein the activity data comprises historical transaction activity or historical credit value utilization;
receiving output of predicted activity scores from the activity machine learning model based on the input activity data;
generating, utilizing a loss function, loss values for the activity machine learning model utilizing a comparison between the output of predicted activity scores and ground truth activity scores for the multiple user accounts from the training data; and
adjusting weights of the activity data variables corresponding to the activity machine learning model based on the generated loss values to train the activity machine learning model to more effectively determine a risk of an account of the multiple user accounts, wherein the activity machine learning model comprises a neural network or a decision tree model;
generate an activity score utilizing the trained activity machine learning model from internal user activity data corresponding to a user account;
determine a dynamic credit value range utilizing a credit value model with the activity score generated from the trained activity machine learning model and a user activity condition corresponding to the user account by:
determining, from an offer category matrix, an offer category for the user account utilizing a combination of the activity score and the user activity condition corresponding to the user account, wherein the offer category matrix maps activity scores and user activity conditions to one or more offer categories; and
determining the dynamic credit value range by identifying one or more dynamic credit values that correspond to the determined offer category within a credit value matrix, wherein the credit value matrix comprises a mapping between offer categories and dynamic credit values;
provide for display, within a graphical user interface of a computing device corresponding to the user account, a user interface slider comprising selectable credit values from the dynamic credit value range; and
upon receiving a selection of a credit value from the computing device, provide for display, within the graphical user interface, one or more dynamic credit value conditions for the credit value determined utilizing the credit value model.

11. The non-transitory computer-readable medium of claim 10, further comprising instructions that, when executed by the at least one processor, cause the computing device to:
receive a selection of an additional credit value from the computing device; and
upon receiving the selection of the additional credit value from the computing device, provide for display, within the graphical user interface, one or more updated dynamic credit value conditions for the additional credit value determined utilizing the credit value model.

12. The non-transitory computer-readable medium of claim 10, further comprising instructions that, when executed by the at least one processor, cause the computing device to modify a base limit value corresponding to the user account based on one or more transaction activities with the credit value from the user account.

13. The non-transitory computer-readable medium of claim 10, further comprising instructions that, when executed by the at least one processor, cause the computing device to determine the offer category utilizing the offer category matrix by identifying an offer category within the offer category matrix that maps to the activity score and the user activity condition corresponding to the user account.

14. The non-transitory computer-readable medium of claim 10, further comprising instructions that, when executed by the at least one processor, cause the computing device to identify the user activity condition by determining a deposit transaction activity of the user account or a frequency of the deposit transaction activity.

15. A system comprising:
at least one processor; and
at least one non-transitory computer-readable storage medium storing instructions that, when executed by the at least one processor, cause the system to:
train an activity machine learning model by:
inputting activity data that includes activity data variables of multiple user accounts into the activity machine learning model as training data, wherein the activity data comprises historical transaction activity or historical credit value utilization;
receiving output of predicted activity scores from the activity machine learning model based on the input activity data;
generating, utilizing a loss function, loss values for the activity machine learning model utilizing a comparison between the output of predicted activity scores and ground truth activity scores for the multiple user accounts from the training data; and
adjusting weights of the activity data variables corresponding to the activity machine learning model based on the generated loss values to train the activity machine learning model to more effectively determine a risk of an account of the multiple user accounts, wherein the activity machine learning model comprises a neural network or a decision tree model;
generate an activity score utilizing the trained activity machine learning model from internal user activity data corresponding to a user account;
determine a dynamic credit value range utilizing a credit value model with the activity score generated from the trained activity machine learning model and a user activity condition corresponding to the user account by:
determining, from an offer category matrix, an offer category for the user account utilizing a combination of the activity score and the user activity condition corresponding to the user account, wherein the offer category matrix maps activity scores and user activity conditions to one or more offer categories; and
determining the dynamic credit value range by identifying one or more dynamic credit values that correspond to the determined offer category within a credit value matrix, wherein the credit value matrix comprises a mapping between offer categories and dynamic credit values;
provide for display, within a graphical user interface of a computing device corresponding to the user account, a user interface slider comprising selectable credit values from the dynamic credit value range; and
upon receiving a selection of a credit value from the computing device, provide for display, within the graphical user interface, one or more dynamic credit value conditions for the credit value determined utilizing the credit value model.

16. The system of claim 15, further comprising instructions that, when executed by the at least one processor, cause the system to provide for display, within the graphical user interface, a selectable option to enable a scheduled transaction for the credit value that indicates a modified dynamic credit value condition.

17. The system of claim 15, further comprising instructions that, when executed by the at least one processor, cause the system to
determine the one or more dynamic credit value conditions by utilizing the selected credit value to determine one or more dynamic credit value condition elements from within the credit value matrix that correspond to the selected credit value and the determined offer category.

18. The system of claim 15, further comprising instructions that, when executed by the at least one processor, cause the system to generate the activity score utilizing the internal user activity data corresponding to the user account without requesting user data for a user of the user account from a third-party network and without user input from the user.

19. The system of claim 15, further comprising instructions that, when executed by the at least one processor, cause the system to:
receive a selection of an additional credit value from the computing device; and
upon receiving the selection of the additional credit value from the computing device, provide for display, within the graphical user interface, one or more updated dynamic credit value conditions for the additional credit value determined utilizing the credit value model.

20. The system of claim 15, further comprising instructions that, when executed by the at least one processor, cause the system to modify a base limit value corresponding to the user account based on one or more transaction activities with the credit value from the user account.

* * * * *